(12) United States Patent
Casto et al.

(10) Patent No.: US 11,080,431 B1
(45) Date of Patent: Aug. 3, 2021

(54) MIXED-SIGNAL PROCESS-SPECIFIC FUNCTION

(71) Applicant: Government of the United States as Represented by the Secretary of the Air Force, Wright-Patterson AFB, OH (US)

(72) Inventors: Matthew J Casto, Beavercreek, OH (US); Waleed Khalil, Dublin, OH (US); Brian Dupaix, Columbus, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 518 days.

(21) Appl. No.: 15/729,873

(22) Filed: Oct. 11, 2017

Related U.S. Application Data

(60) Provisional application No. 62/434,566, filed on Dec. 15, 2016.

(51) Int. Cl.
| | |
|---|---|
| *G06F 21/73* | (2013.01) |
| *G06F 21/44* | (2013.01) |
| *G06F 21/76* | (2013.01) |

(52) U.S. Cl.
CPC .............. *G06F 21/73* (2013.01); *G06F 21/44* (2013.01); *G06F 21/76* (2013.01)

(58) Field of Classification Search
CPC ........... G06F 21/73; G06F 21/44; G06F 21/76
See application file for complete search history.

(56) References Cited

U.S. PATENT DOCUMENTS

| | | | | |
|---|---|---|---|---|
| 5,648,661 A | * | 7/1997 | Rostoker | G01R 31/318505 257/208 |
| 7,313,148 B2 | | 12/2007 | Chu et al. | |

(Continued)

OTHER PUBLICATIONS

Van Der Leest, Anti-Counterfeiting with Hardware Intrinsic Security, Proc. Design Autom. Test Eur. Conf., 2013.
(Continued)

*Primary Examiner* — Kevin Bechtel
*Assistant Examiner* — Thanh H Le
(74) *Attorney, Agent, or Firm* — AFMCLO/JAZ; Timothy M. Barlow

(57) ABSTRACT

Method and apparatus for authenticating analog mixed-signal integrated circuits using process-specific functions (PSF) comprising: presenting wafer having plurality of dies, each die having circuit with identical design but having inherent physical differences due to process variation in their manufacture, each circuit designed to enhance the effects of the inherent differences; defining selected number of inputs/stimuli for authenticating and identifying each integrated circuit; defining expected response for each circuit, wherein the expected response for each circuit is the same due to the identical design; defining statistical window for analog response by the circuit to the inputs/stimuli; applying the inputs/stimuli to each circuit; receiving analog response corresponding to the applied inputs/stimuli, wherein the analog response falls outside statistical window when there are functional or physical changes to the circuit; separating from plurality of dies each die providing a response outside the statistical window, wherein only identified/authenticated dies remain.

3 Claims, 24 Drawing Sheets
(23 of 24 Drawing Sheet(s) Filed in Color)

Block diagram view of a PSF

(56) References Cited

U.S. PATENT DOCUMENTS

| | | | |
|---|---|---|---|
| 7,681,103 B2 | 3/2010 | Devadas et al. | |
| 7,840,803 B2 | 11/2010 | Clarke et al. | |
| 8,386,801 B2* | 2/2013 | Devadas | G06F 21/31 |
| | | | 713/189 |
| 9,081,063 B2* | 7/2015 | Narayanan | G01R 31/3181 |
| 9,171,144 B2* | 10/2015 | Lewis | G06F 21/44 |
| 2006/0212709 A1* | 9/2006 | Kinoshita | H04L 63/0853 |
| | | | 713/176 |
| 2011/0204910 A1* | 8/2011 | Suto | G01R 31/2815 |
| | | | 324/754.01 |
| 2013/0108145 A1 | 5/2013 | Cobb et al. | |

OTHER PUBLICATIONS

Hu, MOS Transistor, Chapter 6, 2009.
Clavier, Distortion in a Pulse Count Modulation System, American Institute of Electrical Engineers, Transactions of the , vol. 66, No. 1, pp. 989,1005, Jan. 1947.
Gray, "Quantization noise spectra," IEEE Trans. Inf. Theory, vol. 36, No. 6, pp. 1230-1244, 1990.
Nikolic, Technology Variability From a Design Perspective, IEEE Transactions on Circuits and Systems-I, vol. 58, No. 9, Sep 2011.

\* cited by examiner

Binary Current Steering DAC Implementation

Harmonic content vs DAC resolution in dBc

Probability distribution of normalized amplitude with MSB 1 variation

Basic Current Steering DAC (a) cell implemented and (b) threshold distribution in 90nm CMOS 90nm DAC current cell distributions of (a) LSB, (b) MSB 2, and (c) MSB DAC waveform output at (a) 1.145 GHz and (b) 331 MHz, and (c) peak voltage output distribution Concept of finite resolution in sampling waveforms DAC output spectrum of 37MHz signal clocked at 4 GHz

MIXED-SIGNAL PROCESS-SPECIFIC FUNCTION

Pursuant to 37 C.F.R. § 1.78(a)(4), this application claims the benefit of and priority to prior filed Provisional Application Ser. No. 62/434,566, filed 15 Dec. 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to a mixed-signal process-specific function and, more particularly, to an apparatus and method for authenticating and identifying analog mixed-signal integrated circuits (IC).

BACKGROUND OF THE INVENTION

As foundry services continue to become more global, supply chains are increasingly less traceable, and as the proliferation of counterfeit electronics grows there is a definitive need for design methodologies which allow for real-time chip authentication, identification, and reliability monitoring. A few detection and avoidance techniques have been proposed to deal with the proliferation of counterfeit and potentially malicious integrated circuits.

Detection techniques have shown some success over the last decade, but require extensive testing time, have high cost, and lack metrics to adequately match changing threats. Avoidance techniques have emerged as the solution of choice to attack the counterfeit problem from the design stage moving forward.

Hardware intrinsic security (HIS) techniques to address chip identification are founded on the principles of extraction and exploitation of unique features from an integrated circuit, such as through process variation, to identify individual chips.

Physically Unclonable Functions (PUFs), originally introduced under the premise of Physical One-Way Functions, have been used to develop and exploit physical randomness functions for silicon devices, making use of the manufacturing process variations in modern ICs, with identical masks, for identification, authentication, and on-chip key generation. A unique digital signature is generated for each IC in a challenge-response form that can be stored to allow later ID of genuine ICs. Various PUF architectures have been proposed including the arbiter PUF, the ring oscillator PUF, and memory based PUFs, such as the SRAM PUF. PUF architectures are typically auxiliary circuits, fabricated for the main purpose of executing the PUF, requiring extra area and measurement overhead when placed on an application specific integrated circuit (ASIC) that is being used for some other function. There is a potential to selectively alter the physical behavior of individual transistors, and therefore trustworthiness cannot be determined by looking at a nearest neighbor.

Memory-based PUFs, and PUFs instantiated on FPGAs (field-programmable gate array) are an exception to this. The FPGA is a purely digital transistor array, and like the memory-based PUFs, because of the digital response format, require an increasing number of gates, and therefore area, in order to improve the security. PUFs are proven to be sensitive to a wide range of environmental variations including temperature, power supply noise, and aging. Error correction and fuzzy extractors are required to improve stability. Digital PUFs, while attractive in terms of cryptography applications, are limited in overall application to authentication and reliability due to the inherent "breakability" of machine learning of the digital challenge response behavior.

Recent literature has also provided claims of the ability to clone PUFs with sophisticated reverse engineering techniques. Radio-frequency distinct native attribute (RF-DNA) fingerprinting has been proposed as a physical-layer technique to enhance the security of various wireless communications devices such as RFID, and 802.11 Wi-Fi. RF-DNA acquired through the unintentional emissions of ICs for device recognition has shown promising empirical results demonstrating the suitability of RF-DNA fingerprinting for both identification and verification of device recognition tasks. Semiconductor-based IC device emissions are passively recognized based on discriminating features extracted from their intrinsic physical properties in a manner analogous to biometric human ID. However, techniques to identify or capture functionality in the chip through electromagnetic emissions and RF-DNA do not produce a deterministic signature, and require library training or a golden standard. There is also a significant level of abstraction in the quantification of the responses that removes any underlying detail about the authenticity of any of the constituent components.

All of this previous work, at the circuit and device level, regardless of the measurement technique, has addressed digital designs. Digital design is inherently done in a fashion that uses variability cancellation, providing a "1" or "0" type operation. Therefore, in order to provide uniqueness metrics, a sum of variations must be great to uniquely identify a structure. More fidelity always requires more gates. Solutions foundationally based on process performance coupled with variation provide the design space for trustworthy analog mixed-signal circuits. Inspection or interrogation techniques to analyze the trustworthiness of an integrated circuit cannot be cumbersome to the point where it is not cost or time effective.

In order to address the shortcomings of the prior art, methods are preferably relatively quick, non-destructive, and sensitive to the degree by which the uniqueness of the process variability was exercised during design. Any changes to the characteristic manufacturing process variations, such as thinning of lines, and changing doping concentrations in active areas should be identifiable. The authentication process should take place on the actual circuitry that is being used in the system, not an external monitor circuit. Circuit traits and signatures used to identify and authenticate the integrated circuit should have properties that are relatable to lifetime reliability performance. Advanced microelectronic fabrication provides a unique opportunity to take advantage of inherent variability to produce statistically-significant mixed-signal integrated circuit traits.

SUMMARY OF THE INVENTION

The present invention overcomes the foregoing problems and other shortcomings, drawbacks, and challenges of integrated circuit authentication and identification. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a method of authenticating and identifying analog mixed-signal integrated circuits using process-specific functions (PSF), the method comprises:

(a) presenting a wafer having a plurality of dies, each die having an integrated circuit with an identical design, each die having inherent physical differences, the identical design of each integrated circuit enhancing the effects of the inherent physical differences;

(b) defining one or more inputs for authenticating and identifying each integrated circuit;

(c) defining an expected analog response to one or more inputs from the integrated circuits having the identical design;

(d) defining a statistical window for the expected analog response to the inputs by each of the integrated circuits having the identical design.

According to a first variation of the invention, a smaller circuit may yield more variation due to the design, e.g. device threshold of determination, and dimensional variations in a smaller device may have a greater effect on the performance characteristics of a smaller circuit than a larger circuit. The inherent physical differences may occur at the molecular level when the design of the integrated circuit is small enough. The dimensional variations may include the length and width of the integrated circuit, the number of fingers and their geometry, and/or the thickness of the integrated circuit or its components. In a CMOS device, for example, the larger the device, the smaller the inherent variations.

According to another variation of the invention, the expected analog response may offer a more simple method for determining the identity and/or authenticity of an integrated circuit, even if the integrated circuit is already incorporated into a larger device. This feature (the expected analog response) distinguishes the present integrated circuit from a PUF (physically unclonable function), which is unpredictable and has no determinable expected response.

According to another variation of the invention, the method may include:

(e) applying one or more inputs to each of the integrated circuits;

(f) receiving the analog response corresponding to the applied inputs, wherein when the analog response for an individual integrated circuit falls outside the statistical window, that integrated circuit includes design differences from the identical design, the differences being at least one of functional and physical changes differences;

(g) receiving the analog response corresponding to the applied inputs, wherein when the analog response falls within the statistical window, that integrated circuit is identified and authenticated.

According to another variation of the invention, the method may include:

(h) identifying which dies include the integrated circuits having the analog response outside the statistical window corresponding to the identical design.

According to a further variation of the invention, the method may include:

(i) separating from the plurality of dies any die which includes the integrated circuit providing the analog response outside the statistical window, wherein only identified and authenticated integrated circuits remain. In this manner integrated circuits that conform to the desired identical design, as well as those integrated circuits that do not conform, may be identified. Those integrated circuits that do not conform may be discarded or utilized in other applications that do not have the identification or authentication requirements.

According to another embodiment of the invention, an apparatus for authenticating and identifying analog mixed-signal integrated circuits using process-specific functions (PSF) comprises:

a memory block storing a plurality of inputs for authenticating and identifying an integrated circuit;

a SRAM module in communication with the memory block;

a current source array in communication with the SRAM module for communicating digital inputs into the integrated circuit, wherein the apparatus functions as a digital-to-analog converter and generates an analog amplitude response from the integrated circuit based on the design of the integrated circuit in response to one or more inputs from the memory block.

In one embodiment of the apparatus for authenticating and identifying analog mixed-signal integrated circuits using process-specific functions, the integrated circuits have an identical design that responds to the inputs at distinct, predictable frequencies based on the design of the integrated circuit.

In another embodiment of the apparatus for authenticating and identifying analog mixed-signal integrated circuits using process-specific functions, any variation in the response of the integrated circuits having identical designs corresponds to inherent physical differences due to process variation during manufacture of the integrated circuits.

In a further embodiment of the apparatus for authenticating and identifying analog mixed-signal integrated circuits using process-specific functions, each integrated circuit is designed in order to enhance the effects of the inherent physical differences.

The method and apparatus provide distinct advantages in the authentication and identification of integrated circuits, including that the integrated circuit (IC) itself, and not an integrated PUF or other arrangement, is the object of the authentication and identification method and apparatus. This arrangement may eliminate the need to include single-purpose or dedicated security features into ICs. Another advantage is that the authentication and identification method and apparatus are the same for all integrated circuits having the same circuit design, e.g. circuit architecture. Accordingly, a unique authentication and/or identity fingerprint for each individual IC may not be necessary. Any IC conforming to the specified, identical design will behave according to the protocol established for that specified IC design and will be able to be authenticated and identified. Conversely, if the identical design of the IC is altered or tampered with the response of the IC to the inputs will not fall within the statistical window established for the IC design. Such non-conforming ICs may be suspect and discarded or used in non-critical applications where identification and/or authentication may not be as important.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

Figure 1:
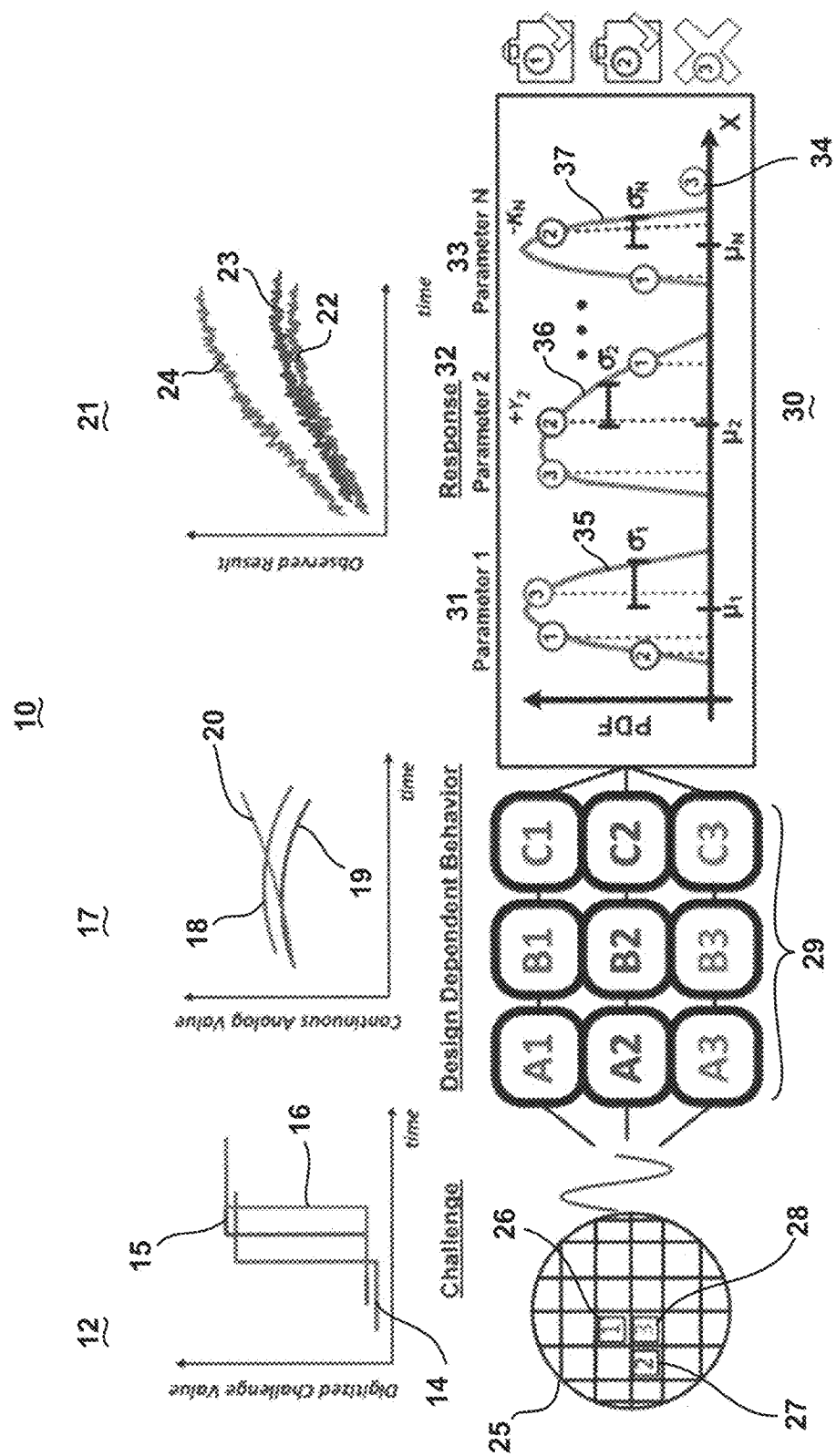
FIG. 1 depicts a block diagram of a process specific function, according to an embodiment of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Analyzing information from performance traits and unique fingerprints can provide quick, accurate correlation to models of reliability and lifetime prediction in operating electronics. Mixed-Signal, Analog, and Radio Frequency circuits can be designed to exhibit unique behavior based on inherent random differences in processing/manufacture. These unique behaviors can be used to identify and group circuits of the same pedigree, i.e. having identical design, and such unique behaviors provide traits which may be useful for reliability monitoring. Furthermore, these "fingerprints" can be exploited for purposes of individual chip authentication.

The invention described provides a technique to evaluate the trustworthiness of mixed signal integrated circuits from untrusted sources. The major improvement over state of the art is the mixed-signal solution space for unique authentication and identification that has not been addressed on the IC of interest. The technique does not require any external circuits, which increases confidence on the usable part and reduces overall required area. Specifically, this technique provides a 3× reduction in area as compared to current state-of-the-art techniques of memory based authentication on a cell by cell basis. This is the first technique known to the authors to provide a design space in the analog mixed-signal domain for generating a secure hardware block addressing authentication, identification, and reliability signatures. The technique provides a statistical representation of measureable deterministic behavior, not just digitally quantified difference vectors.

The present invention is a design and characterization methodology to uniquely identify, authenticate, and monitor reliability performance of a mixed-signal integrated circuit. The technique utilizes the fact that no two circuits are able to be manufactured to be completely identical, coupled with measurable performance metrics that are dependent on the differences. In integrated circuits, characteristic differences result from the potential at which the circuit operates (threshold) as well as the speed at which it moves electrical carriers (mobility and saturation velocity). These properties, as well as the circuit's dependency on these properties can be adjusted by specifically choosing the circuits constituent parts geometry. Embodiment of the disclosure is expressed in a mixed-signal quantizer, known as a digital to analog converter (DAC), to produce a statistically-unique, deterministic electromagnetic spectrum. As stated, this is the first invention known to the authors where mixed-signal integrated circuit behavior is exploited for the stated applications.

There exists a unique fingerprint behavior for each building block in an integrated circuit system that is sensitive to random process variations to the degree by which it can be characterized. This behavior will be referred to as a "Process Specific Function" (PSF). The PSF is a measureable behavior, i.e. a frequency "response", in the electromagnetic spectrum that is deterministic in behavior based on a provided stimulus. The stimulus, i.e. input, is often referred to as a "challenge" in hardware security literature. The best that can be done to characterize a random process is to produce data that has a mean(s) (μ), variance(s) (σ), and moment(s) (i.e. skewness, $\Upsilon$, and kurtosis, k) coupled with a statistically relevant distribution following accepted rigorous mathematical processes. The language used here allows the integrated circuit to be viewed as a challenge/response block that is familiar language in hardware security literature.

Process Specific Functions (PSFs) are a novel approach for mixed-signal chip identification to prevent counterfeit and malicious IC insertion. PSFs provide an authentication solution space not addressed by previous methods, as well as provide characteristic measurable performance metrics for integration into current advanced reliability prediction capabilities. When physically connected, a chain of components may be challenged to provide a statistically unique response.

In one embodiment of the invention, PSFs address design, fabrication, and measurement in the analog mixed-signal (AMS) design space. This holistic approach has not previously been addressed. Because this is an original concept, there are no specific performance metrics to benchmark. Instead, a comprehensive treatment of analyzing components for trustworthiness is considered and will be discussed.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

FIG. 1 depict a block diagram concept of a process-specific function (PSF) 10. Each die 26, 27, 28 on the wafer 25 contains an identical design at the circuit level, but each die 26, 27, 28 is different at the physical level due to process variation during its manufacture. That is, each die 26, 27, 28 is slightly different at the microscopic level, even with when the tightest process control is used during their manufacture. Each die 26, 27, 28 is designed in order to enhance the effects of the inherent variation based on statistical models of the process. These design considerations are contrary to normal manufacturing practice. According to an embodiment of the invention, an integrated circuit corresponding to a die 26, 27, 28 is designed to enhance the variability of the response, but without compromising the performance of the integrated circuit. For authentication of each die/integrated circuit, a challenge 14, 15, 16 from a plurality of possible challenges 12 is then provided to a die 26, 27, 28 on the wafer 25 (FIG. 1 depicts three numbered dies 26, 27, 28 on the wafer 25), each of which contains three functional components or blocks 29 in this example. The three blocks A, B, C of array 29 represent sub-blocks of each die/integrated circuit 26, 27, 28 having the identical design, and blocks 1, 2, 3 represent individual dies 26, 27, 28 of the wafer 25. Sub-blocks may include memory, a current steering array, output, and others. The challenges may be analog and or digital inputs as time-varying signals, and there may be numerous define and/or random options. Each presented challenge 14, 15, 16 is acted on by each dies' circuit to produce an array 17 of analog responses 18, 19, 20, with each analog response corresponding to a particular input challenge 14, 15, 16. Three distinct challenges 14, 15, 16 are depicted in FIG. 1. The response for each individual integrated circuit 26, 27, 28 is parameterized, 1 to N parameters 20 according to the desired parameters, e.g. voltage, frequency, current, amplitude, etc. A composite response of the dies to a particular signal is illustrated as element 21 of FIG. 1. Element 21 is an illustration of three composite responses 22, 23, 24 (i.e. expected analog responses) of a plurality of dies to three distinct challenges. Notice that each of the dies' three responses (one response to each challenge) is on the same composite curve 22, 23, 24, but that there are variations in each response curve 22, 23, 24. The variations in the response curves 22, 23, 24 are due to the manufacturing variations in the dies/integrated circuits, even though they were made according to an identical design. The response of each integrated circuit manufactured according to the identical design will exhibit a uniform response 21 to a particular challenge 12, differing only due to the influence of process variation during manufacture. Accordingly, each response 30 falls within a defined statistical window 31, 32, 33 for an integrated circuit manufactured according to the identical design described above. Elements 31, 32, 33 illustrate statistical windows (probability distribution functions, or PDF, represented by the plotted curve) for each parameter (1 through N) selected. The parameters may include, for example, frequency, amplitude, voltage, current, and any other observable parameter. The numbers 1, 2, 3 on or near the PDF for each parameter correspond to the integrated circuit's response to a particular challenge 14, 15, 16, respectively. The parameters are selected and defined such that they capture the functional intent of the integrated circuit and exhibit sensitivity to the extent of expected process variation. If manufacturing process parameters change, or if there are functional changes to the circuit, the analog response by the integrated circuit may fall outside of the statistical parameter window 34, as illustrated for parameter N and the third integrated circuit/die 28. A response outside the statistical window 34 means that the manufacturing variations are too great or that the integrated circuit includes functional or other changes from the identical design. Additionally, the parameters 1 through N may be used as traits for reliability monitoring, as described below. For identification and/or authentication of the integrated circuits, the number of parameters, N, may be increased until a unique response is aggregately obtained. The design of the blocks of the die, their interior configuration, i.e. the integrated circuit, and the particular challenge determine the PSF response. The statistical "shape" of the output 31, 32, 33 is a result of the constituent components of the integrated circuits/dies. The challenge plot 12 represents the signal (e.g. digital) input from the memory block (described below) into a circuit with respect to time. The design-dependent behavior plot 17 represents the analog output 18, 19, 20 received from the circuit in continuous time. The response plot 21 represents the composite signature corresponding to each output observed over time for circuits having an identical design.

Figure 2:
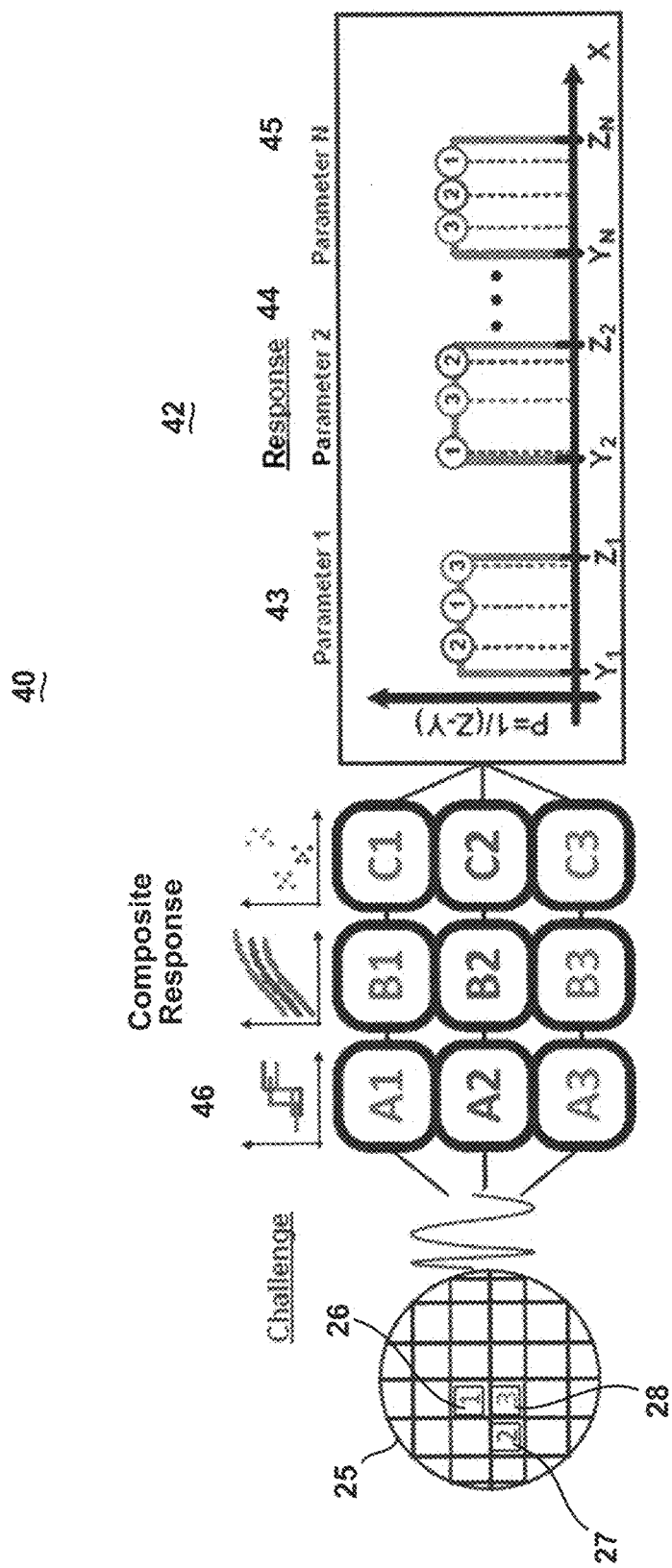
FIG. 2 depicts random uniform process specific function across measurement space.

In one embodiment, a completely random uniform response generation could be a specific case of PSF that may be used for unique "key-like" authentication of the same integrated circuit. FIG. 2 depicts a diagram of a uniform probability distribution response 42 where there are unique responses for each parameter 43, 44, 45 in the measurement space, [Y, Z], across a varying challenge 46. The measurement space describes those parameters that may be observed, and which may be useful for identifying or authenticating integrated circuits.

Figure 3:
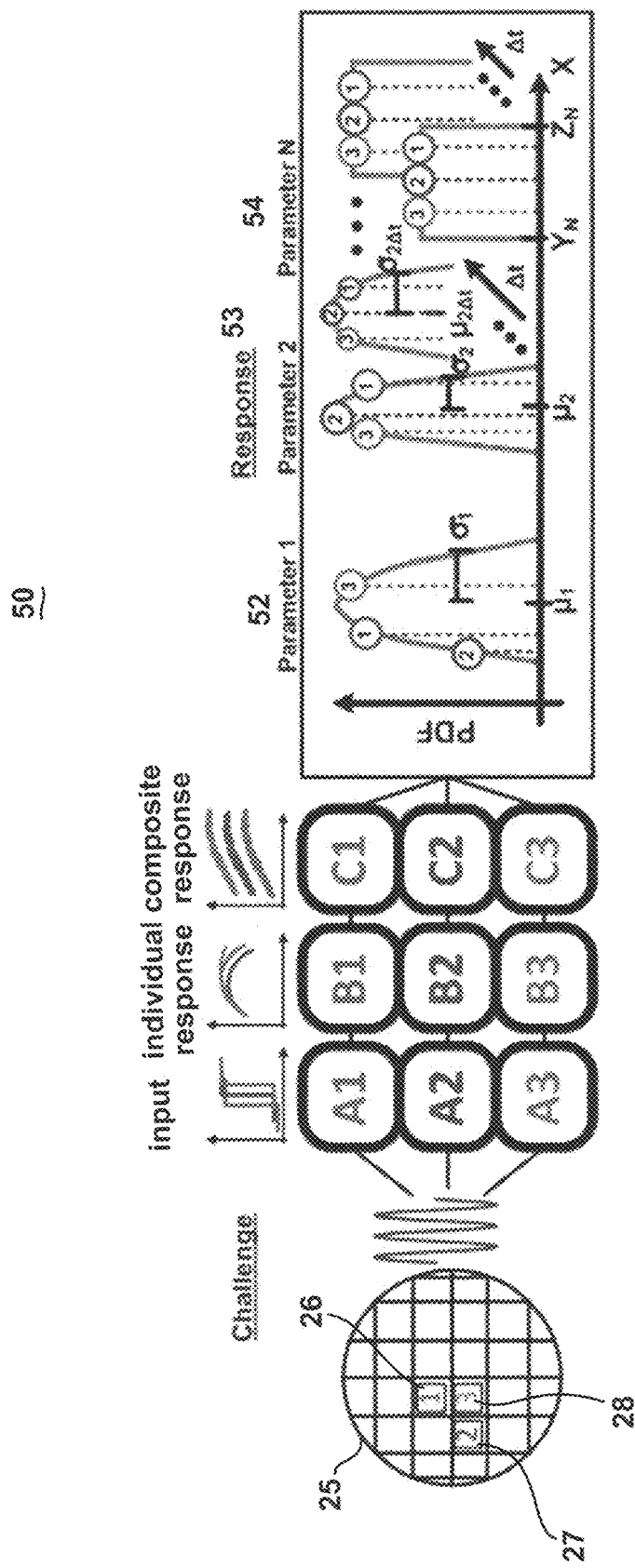
FIG. 3 depicts a process specific function with a response for authentication, identification and reliability.

In another embodiment, the PSF concept may be expressed in a case that has parameters useful for authentication, identification, and reliability signature monitoring. FIG. 3 depicts a specific case 50, where a challenge and design may provide inclusive characteristics. In this example, parameter 1 (52) may be used for pedigree (i.e. IC design) authentication, and parameter 2 (53) may be used for reliability signature monitoring, which is expanded on in FIG. 4 through FIG. 7, and parameter N (54) may be used for unique identification.

Figure 4:
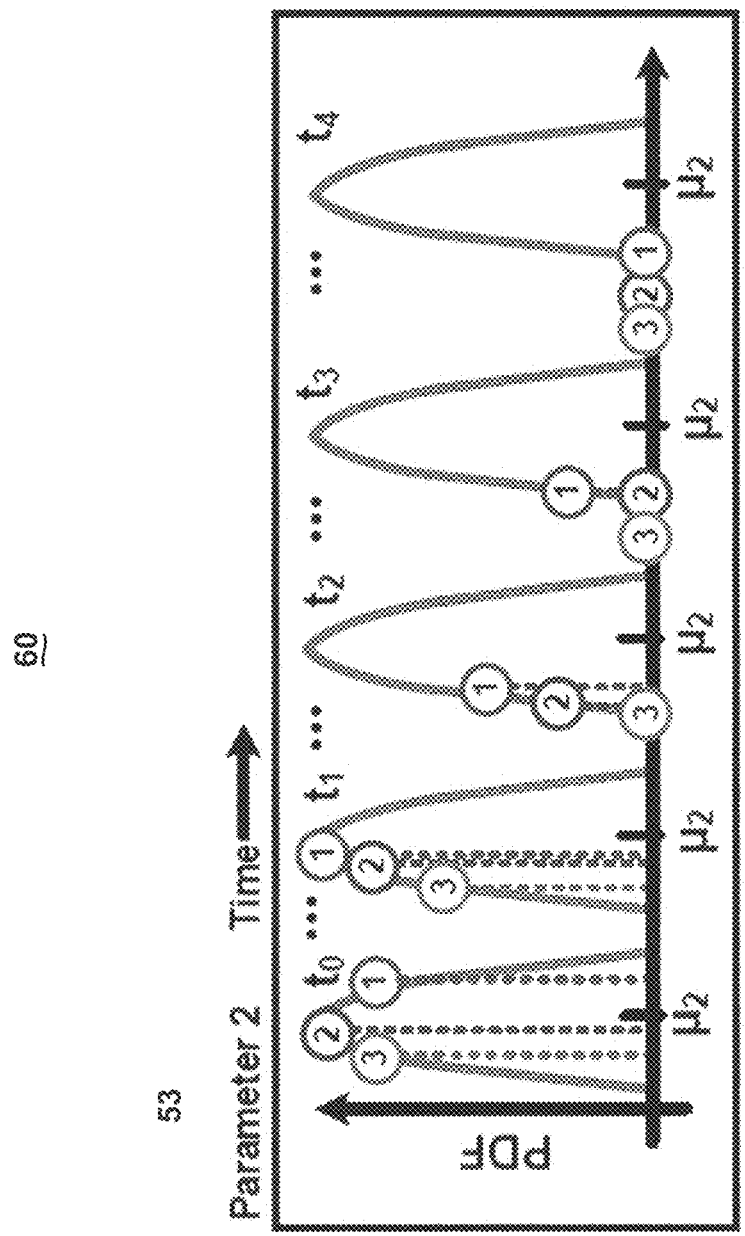
FIG. 4 depicts a reliability signature parameter over time.

FIG. 4 depicts parameter 2 (53) of FIG. 3 expanded on as a reliability signature and showing measureable change of the performance of the integrated circuit over time, t0 to t4. The numbers 1, 2, 3 on or near the PDF for each parameter correspond to the integrated circuit's response to a particular challenge. As an integrated circuit ages, its response will change until its response falls outside the statistical windows or PDF (represented by the plotted curve). At that point the integrated circuit can no longer be identified or authenticated. In this example, the response of the IC to each of the challenges 1-3 are on or within the statistical window/PDF for each challenge 1-3 at times $t_0$, $t_1$ and $t_2$. However, at $t_3$, response 3 is outside the statistical window, and at $t_4$ responses 2 and 3 are both outside the statistical window. Accordingly, at time $t_3$, the IC may be rejected as not conforming to the PDF for the identical design. In one embodiment of the invention, authentication is not time dependent, but reliability may be time dependent.

Figure 5:
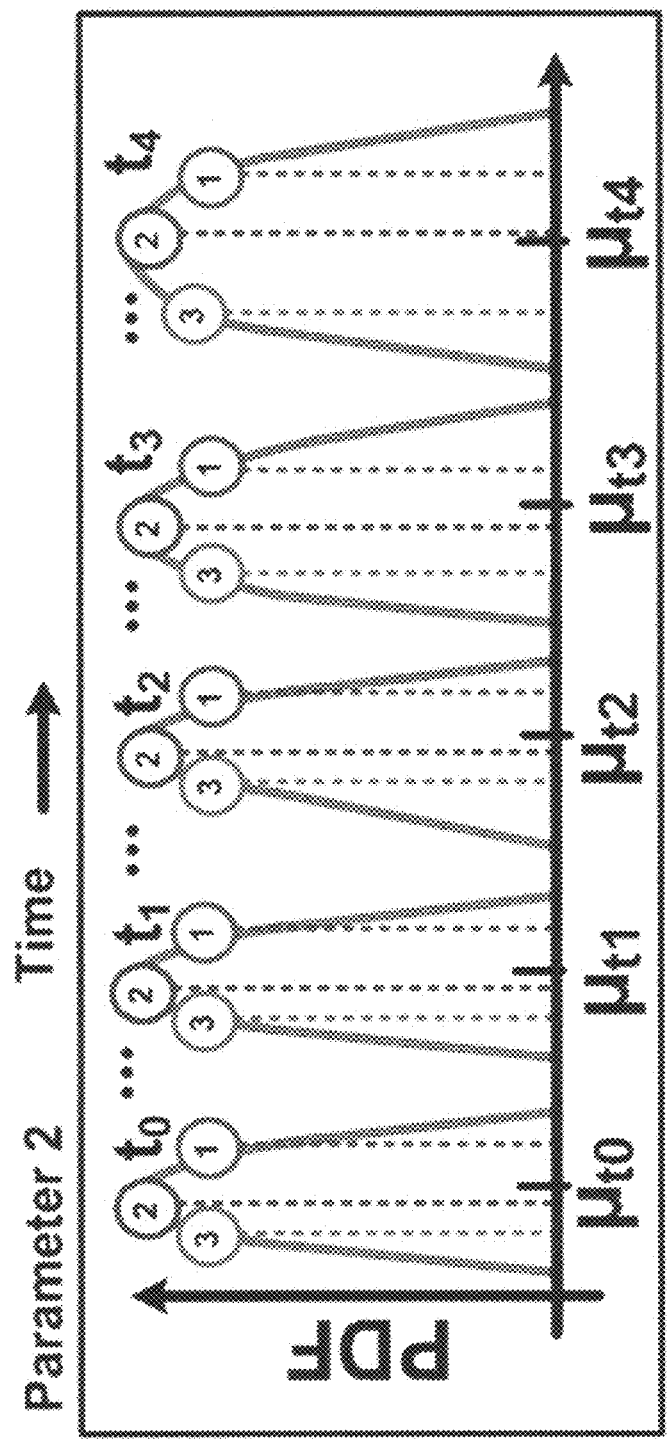
FIG. 5 depicts a reliability signature parameter with changing distribution mean over time.

FIG. 5 illustrates that behavior from each circuit is expected to remain consistent relative to other ICs of the same pedigree, i.e. identical design, with a changing mean value over time, to reflect the tracking of the reliability signature. The mean may be a cumulative response of each of the ICs having the same pedigree. In this manner, even though the response characteristics of an IC may change over time, the IC may still be able to be authenticated based on the relatively uniformly changing response characteristics of other ICs of the same pedigree. In this example, the response of the IC to the three challenges 1-3 results in the gradual broadening of the PDF from $t_0$ to $t_4$.

Figure 6:
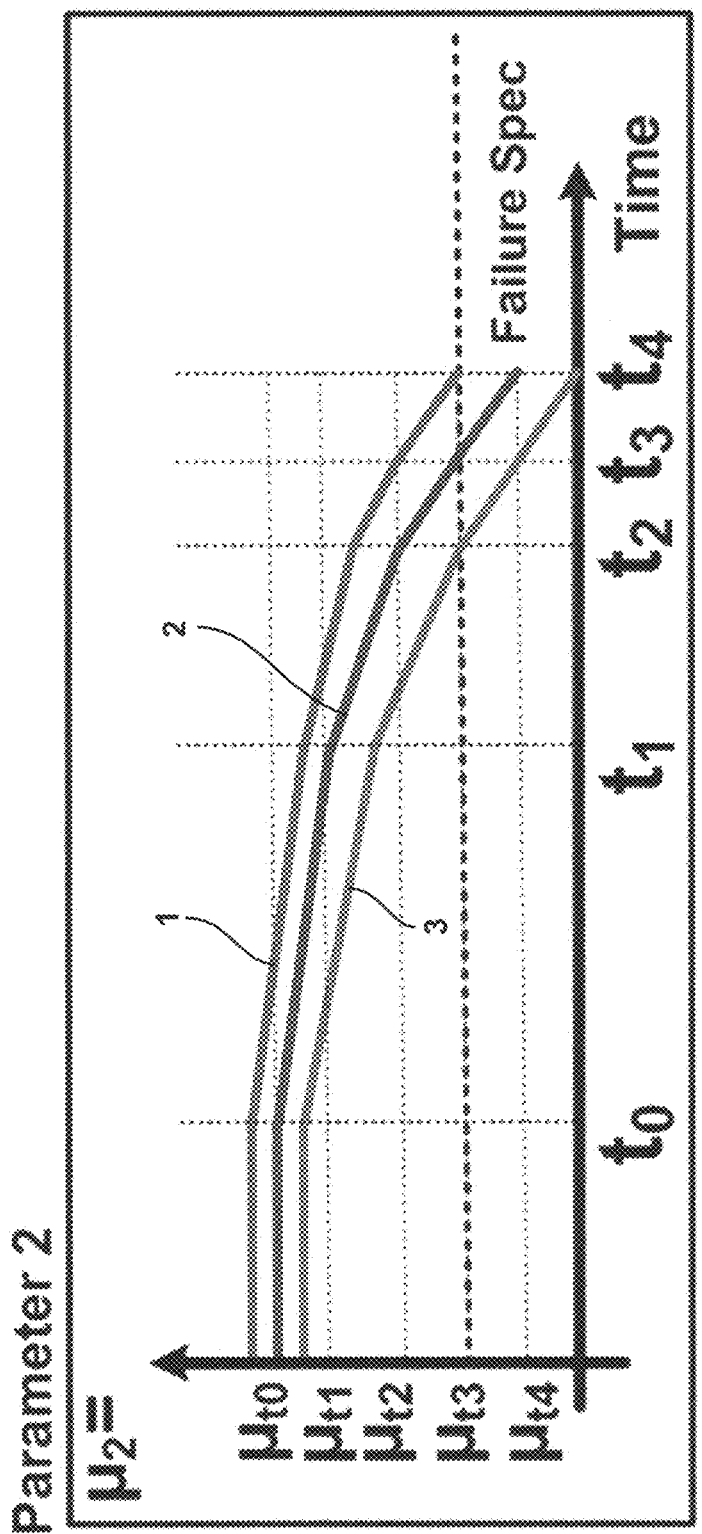
FIG. 6 depicts a reliability signature parameter measured over time.

The measured value of the reliability signature parameter, e.g. parameter 2, over time is illustrated in FIG. 6. This measurement space provides the capability to relate the current state of the IC to its projected lifetime. The IC may be considered at the end of its life when the mean breaches the failure specification. The determination of the failure spec depends upon the application. The relationship of the mean over time illustrated may allow the determination of the lifetime of the probability distribution. In this example, the response corresponding to challenge 3 (the bottom curve) breaches the failure spec between $t_2$ and $t_3$.

Figure 7:
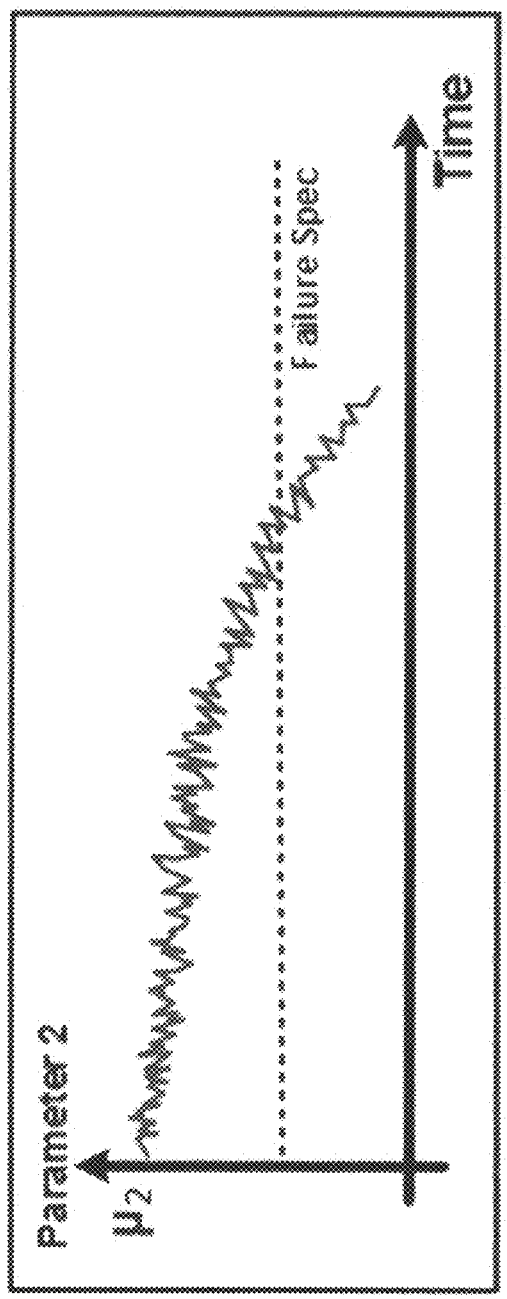
FIG. 7 depicts a reliability signature parameter measured on any initially authenticated part.

A circuit within the original distribution may be characterized by measuring the reliability signature parameter, e.g. parameter 2, to obtain information on remaining life. FIG. 7 illustrates what the plot might look like for a randomly-chosen, previously-authenticated IC at any time from fabrication, conceptually $t_0$, to the end of its life, e.g. when the plot breaches the failure specification. The plot of FIG. 7 is a composite of a plurality of randomly-chosen previously-authenticated ICs having an identical design. The plot illustrates that, while performance of individual ICs may vary somewhat from one another, the overall trend of the curve over time is quite uniform and predictable. Thus lifespan (reliability) forecasting may be accomplished in a reasonable manner.

According to one embodiment of the present invention a method of authenticating and identifying analog mixed-signal integrated circuits using process-specific functions (PSF), the method comprises:

(a) presenting a wafer 25 having a plurality of dies 26, 27, 28, each die 26, 27, 28 having an integrated circuit with an identical design, each die 26, 27, 28 having inherent physical differences, the identical design of each integrated circuit enhancing the effects of the inherent physical differences;

(b) defining one or more inputs 14, 15, 16 for authenticating and identifying each integrated circuit;

(c) defining an expected analog response 22, 23, 24 to the one or more inputs 14, 15, 16 from the integrated circuits having the identical design;

(d) defining a statistical window 35, 36, 37 for the expected analog response 22, 23, 24 to the inputs 14, 15, 16 by each of the integrated circuits having the identical design.

According to a further embodiment of the invention, a smaller circuit may yield more variation due to the design, e.g. device threshold of determination, and dimensional variations (L×W, and optionally H or thickness) in a smaller device may have a greater effect on the performance characteristics of a smaller circuit than a larger circuit. The inherent physical differences may be found at the molecular level.

According to another embodiment of the invention, the expected analog response 22, 23, 24 may offer a more simple method for determining the identity and/or authenticity of an integrated circuit, even if the integrated circuit is already incorporated into a larger device. The expected analog response 22, 23, 24 distinguishes the present integrated circuit from a PUF (physically unclonable function), which is unpredictable and has no determinable expected response.

According to further embodiment of the invention, the method may include:

(e) applying one or more inputs 14, 15, 16 to each of the integrated circuits;

(f) receiving the expected analog response 22, 23, 24 corresponding to the applied inputs 14, 15, 16, wherein when the expected analog response 22, 23, 24 for an individual integrated circuit falls outside the statistical window 35, 36, 37, that integrated circuit includes design differences from the identical design, the differences being at least one of functional and physical changes differences;

(g) receiving the expected analog response 22, 23, 24 corresponding to the applied inputs 14, 15, 16, wherein when the expected analog response 22, 23, 24 falls within the statistical window 35, 36, 37, that integrated circuit is identified and authenticated.

According to another variation of the invention, the method may include:

(h) identifying which dies 26, 27, 28 include the integrated circuits having the expected analog response 22, 23, 24 outside the statistical window 35, 36, 37 corresponding to the identical design.

According to a further embodiment of the invention, the method may include:

(i) separating from the plurality of dies 14, 15, 16 any die which includes the integrated circuit providing the expected analog response 22, 23, 24 outside the statistical window 35, 36, 37, wherein only identified and authenticated integrated circuits remain. In this manner integrated circuits that conform to the desired identical design, as well as those integrated circuits that do not conform, may be identified. Those integrated circuits that do not conform may be discarded or utilized in other applications that do not have the identification or authentication requirements.

Figure 8:
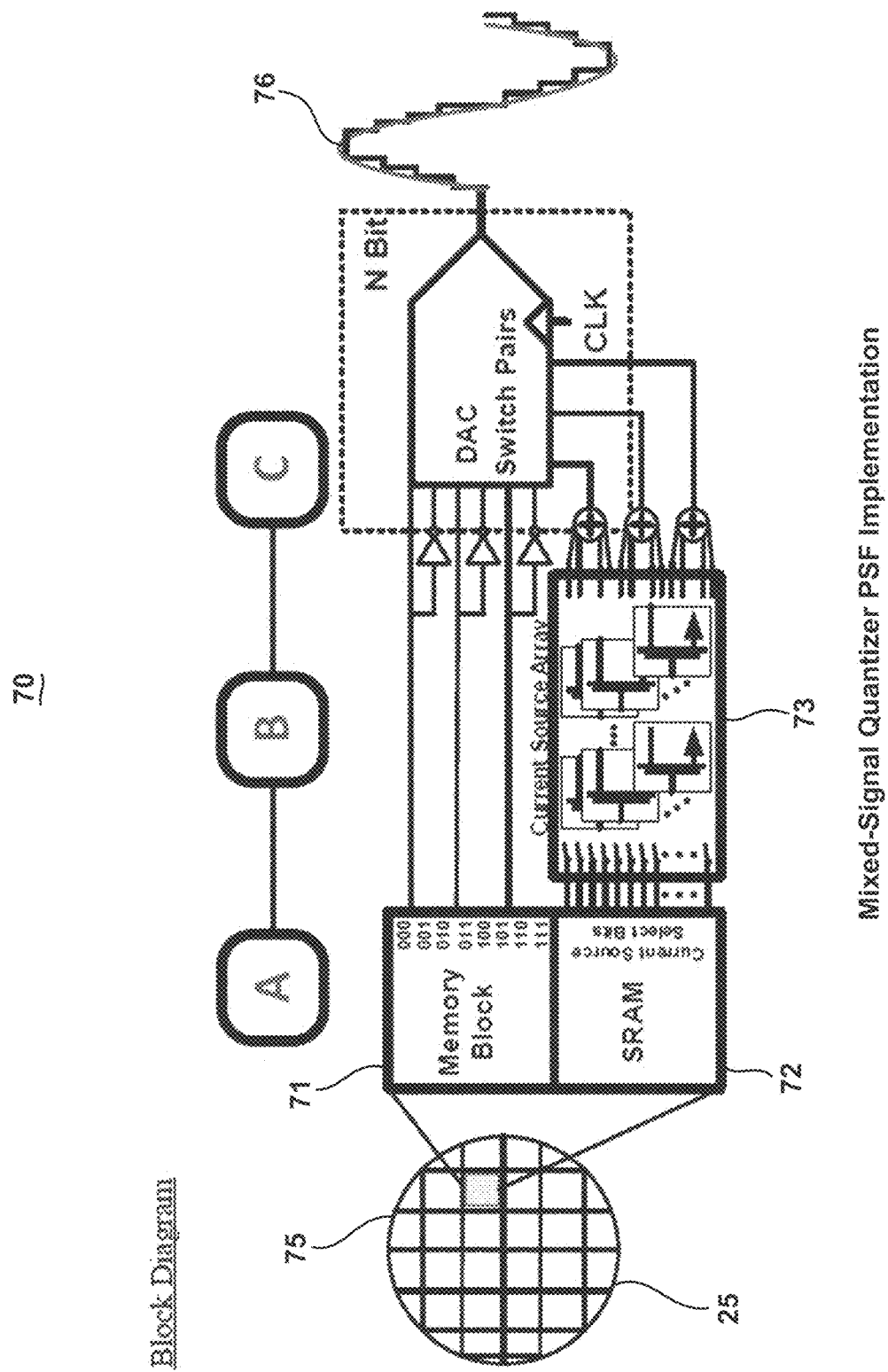
FIG. 8 depicts an implementation of a mixed-signal quantizer process specific function.

According to another embodiment of the invention, as depicted in FIG. 8, for example, an apparatus for authenticating and identifying analog mixed-signal integrated circuits using process-specific functions (PSF) comprises:

a memory block 71 storing a plurality of inputs 14, 15, 16 for authenticating and identifying an integrated circuit 75;

a SRAM module 72 in communication with the memory block 71;

a current source array 73 in communication with the SRAM module 72 for communicating digital inputs into the integrated circuit 75, wherein the apparatus functions as a digital-to-analog converter and generates an analog amplitude response 76 from the integrated circuit 75 based on the design of the integrated circuit, in response to one or more inputs 14, 15, 16 from the memory block 71.

In one embodiment of the apparatus for authenticating and identifying analog mixed-signal integrated circuits using process-specific functions, the integrated circuits 75 have an identical design that responds to the inputs 14, 15, 16 at distinct, predictable frequencies based on the design of the integrated circuit 75.

In another embodiment of the apparatus for authenticating and identifying analog mixed-signal integrated circuits using process-specific functions, any variation in the response of the integrated circuits 75 having identical designs corresponds to inherent physical differences due to process variation during manufacture of the integrated circuits 75.

In a further embodiment of the apparatus for authenticating and identifying analog mixed-signal integrated circuits using process-specific functions, each integrated circuit 75 is designed in order to enhance the effects of the inherent physical differences.

The method and apparatus provide distinct advantages in the authentication and identification of integrated circuits, including (1) that the IC itself, and not an integrated PUF or other arrangement, is the object of the authentication and identification method and apparatus, which eliminates the need to include single-purpose and dedicated security features into ICs, and (2) the authentication and identification method and apparatus are the same for all integrated circuits having the same circuit architecture, i.e. pedigree, which eliminates the need to have a unique authentication/identity fingerprint for each individual IC. Accordingly, any IC conforming to the specified design will behave according to the protocol established for that specified IC design and will be able to be authenticated and identified.

The novel approach to implementing the mixed-signal quantizer system is illustrated in FIG. 8. The architecture allows for a programmed set of current source values to authenticate and generate a deterministic signature response. Additional functionality can be gained by allowing the SRAM array 72 to provide random value to select current sources from the SRAM, generating an identification test mode for the system. When an SRAM is instantiated it will have unique tendency values before read or written to.

Quantizer

The quantizer (see FIG. 8), a digital-to-analog converter, when presented with an input 14, 15, 16, e.g. a digitized sinusoid input, from the memory block 71 will generate an amplitude response at distinct, predictable frequencies in the electromagnetic spectrum based on the integrated circuit 75 architecture. Binary structures which utilize binary encoding will generate tones at the fundamental and odd order harmonics, while a fully-thermometer (which utilizes unary encoding) or segmented structure will generate tone values at the fundamental frequency as well as all harmonics. The amplitude of the harmonics, their value relative to the amplitude of the other harmonics as well as noise in the system are dependent on the integrated circuit design.

In the case of an N-bit DAC, the input digital data may be described as having N binary input bits defined by a vector as equation (1), $$\hat{B} = \{b_{N-1}, b_{N-2}, b_{N-3}, \ldots, b_1 b_0\} \quad (1)$$

Where $b_i \in \{0,1\}$, and $b_0$ is the least significant bit (LSB), and $b_{N-1}$ is the most significant bit (MSB). These bits may come from the memory block 71 in FIG. 8. The vector may then be converted to a decimal value D by equation (2).

$$D = \sum_{i=0}^{N-1} 2^i b_i \quad (2)$$

This value may then be multiplied by a gain factor, such as $V_{LSB}$ (where $V_{LSB} = V_{FS}/2^N$) for voltage or charge-based DACs and $I_{LSB}$ (where $I_{LSB} = I_{FS}/2^N$) for current-steering DACs, to yield the final analog voltage (or current):

$$V_{OUT}(D) = D \cdot V_{LSB}; I_{OUT}(D) = D \cdot I_{LSB} \quad (3)$$

Figure 9:
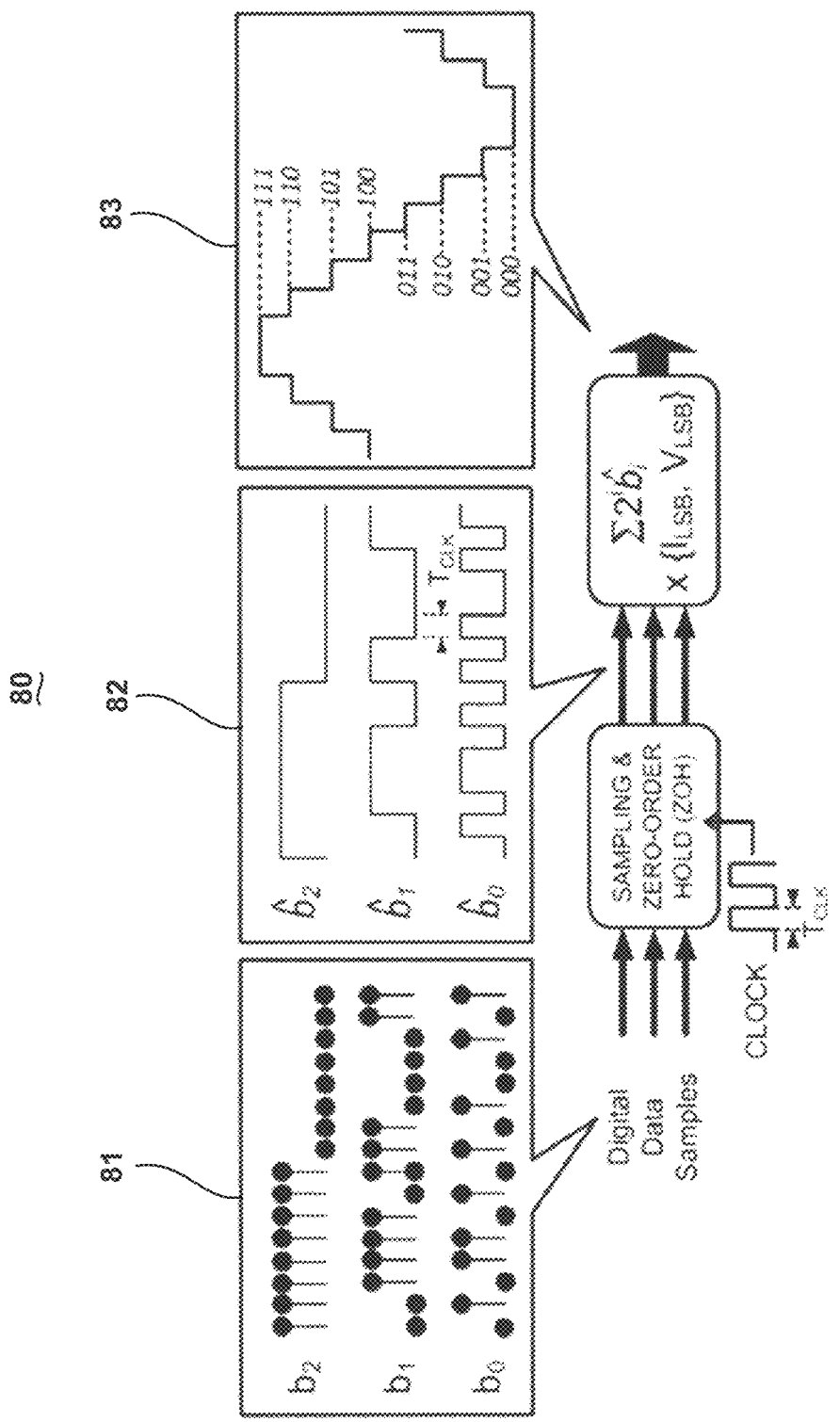
FIG. 9 depicts a basic function of a 3-bit digital-to-analog converter (DAC)

The basic operation of a 3-bit DAC is illustrated in FIG. 9. Assuming an ideal sampling process, i.e. when the circuit is sampled you get no physical contribution from the sampling operation, the DAC may be fed with data in the form of impulse trains 81, which are discrete digital time signals. However, finite switching time in real circuits makes it necessary to supply square-wave pulses 82 as a continuous time signal, holding the input for the duration of $T_{CLK}$, known as the zero-order hold (ZOH). The converter circuit (not shown) assigns analog (i.e. current, voltage, or charge) weights corresponding to the digital input code 81, and then sums them up to the final discrete (stair-step) output 83.

Figure 10:
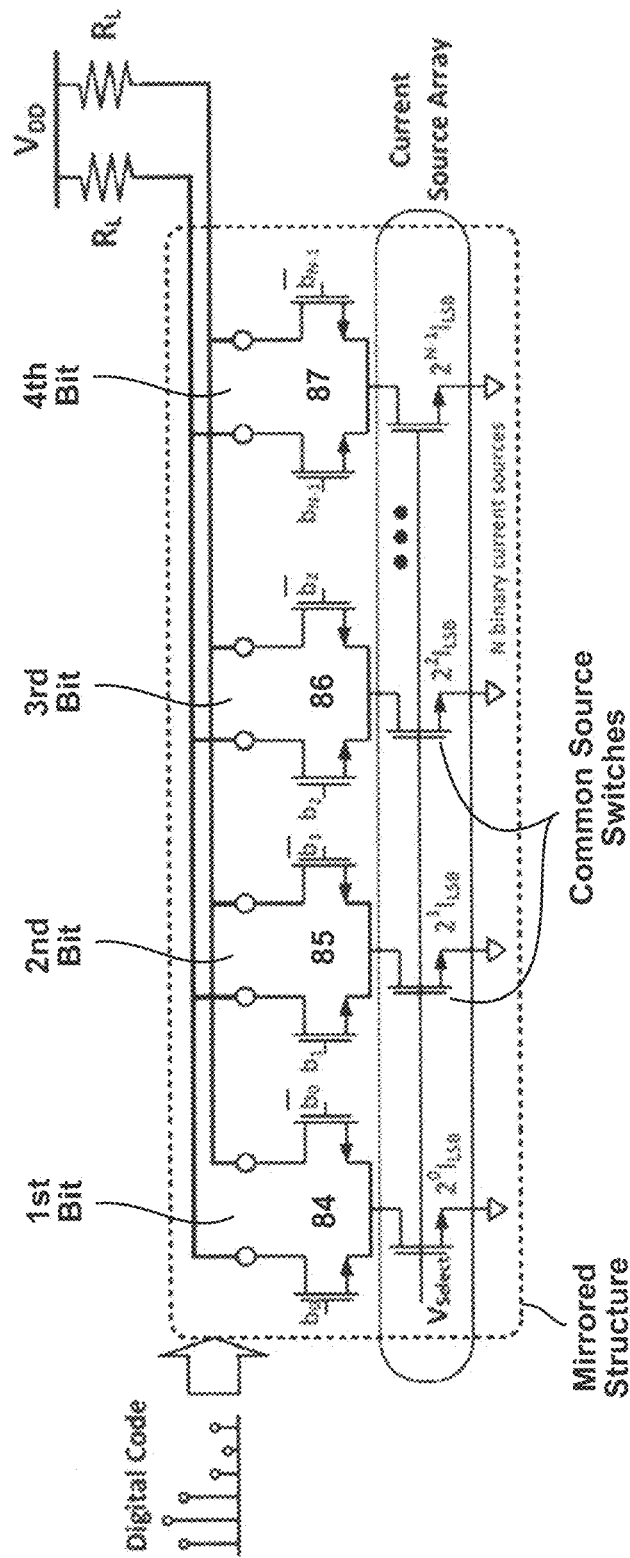
FIG. 10 depicts an implementation of a binary current steering DAC.

Among the different DAC topologies, a current-steering architecture (see FIG. 10) satisfies high-speed and high-resolution applications. A straightforward implementation of a current steering DAC is an array of binary-weighted current sources. Other topologies of DAC encoding may be used, e.g. thermometer or segmented. A device-level schematic of an N-bit current steering DAC is depicted in FIG. 10. The current source array supplies the tail bias to the differential switch pair 84, 85, 86, 87.

Based on the input digital code from the memory block 71, the corresponding current-commutating switch-pair 84, 85, 86, 87 steers the direction of the current into one of the differential arms of the DAC output $R_L$. Two load resistors $R_L$, e.g. 50Ω each, are used to convert the differential DAC output current to a voltage signal $V_{DD}$. Assuming an LSB current of $I_{LSB}$, and noting $b_i$ as the $i^{th}$ binary bit of the digital code, the output of an N—bit binary weighted DAC may be written as, $$I_{OUT} = I_{LSB} \sum_{i=0}^{N-1} 2^i b_i \quad (4)$$

Current Source Array Weighting

Figure 11:
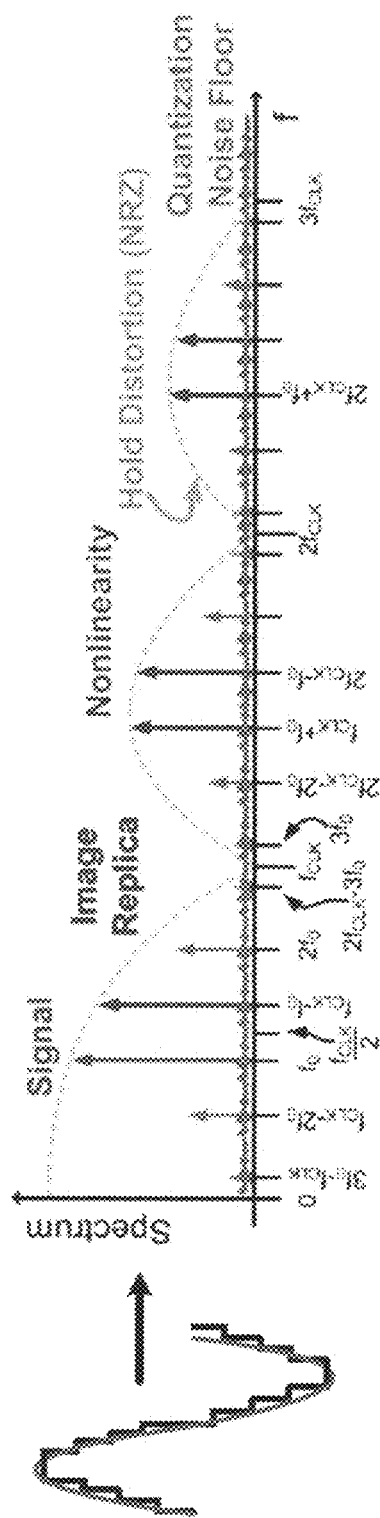
FIG. 11 depicts a foundational DAC spectrum.

The currents may be generated from a mirrored structure, i.e. the structure that sets the value, providing charge to the array of common source switches, where one switch mirrors multiple current sources, each having a unique current value based on design geometry and manufacturing variations. The individual devices may be designed in order to provide a unique distribution and range from unary to binary increments. Each source may be included, "connected", or excluded, "disconnected", by a switch which has its enable controlled by the random weighting input, i.e. random output from SRAM. The bias currents that are connected for each bank may be summed and presented as the bias or tail current to the current steering quantizer topology. This particularly adaptable portion of the invention allows the user to provide the random weighting as described in a "test mode". "Test mode" may provide more information because any input may be used, and not just a particular operation. While in "operation" mode the user may pick a specific number of non-random sources, i.e. current sources, to contribute an appropriate weight, e.g. the size of the tail current which creates binary or thermometer design, for standard quantizer operation based on knowledge of the initial design, e.g. transistor sizes, the total value of the current. The near-instantaneous jumps in analog levels of the resultant stair-step waveform shown at the output of the block diagram in FIG. 8 as well as in the waveforms in FIG. 9 indicate that the signal comprises a wide bandwidth. This frequency content of DAC operation is illustrated in FIG. 11. The constituent parts of FIG. 11 are quantization error(noise floor), image replicas, non-linear spurs, and hold distortion.

The finite resolution of the DAC results in inherent quantization noise that ultimately sets the minimum noise floor. If the DAC clocked at $f_{CLK}$ (see FIG. 11) is used to synthesize an output signal at $f_0$, image replicas are generated at $f_{CLK} \pm f_0$, $2f_{CLK} \pm f_0$, $3f_{CLK} \pm f_0$ and so on. A DAC's output spectrum may be divided into Nyquist zones defined at $nf_{CLK}/2$ where n=1, 2, 3, .... The signal, image replicas, and distortion products are attenuated with a hold distortion sinc response. While there are several zero-order hold variations, the most often used is a non-return-to-zero (NRZ), where the DAC output is held for the entire duration of $T_{CLK}$. This view of the DAC spectrum provides the PSF design space.

Current Source Array, Defined or Random

The invention may utilize a random set of potentials present on an initial memory structure, simply a non-programmed memory array. An SRAM (static random access memory) will "boot-up" to an initial value on each cell based on the inherent differences in each cell from manufacturing properties. These random potentials, essentially representing a digitized random waveform, are read out and presented to a bank of switches controlling bias current sources. These values may be random for the "test mode", or may be provided a specific value to choose specific current sources to operate the circuit in "operation" mode. In either case, the current source's ultimate value will be influenced by the inherent random variation due to manufacturing variations. A random selection of the current sources only contributes further to reaching a unique or uniform behavior for identification. The inherent random variation exists between adjacent dies on the same wafer.

To determine harmonic spectrum dependency on process variation it may be necessary to consider the individual variation of the current sources, and subsequently a development of the equations representing the bit waveform level of the DAC. The bit waveforms may be generated from treatment of the quantization error for fixed full-scale values and quantization levels, i.e. current source values. This is valuable for first pass theoretical treatment of the functional boundary conditions of DACs. A framework may be used to allow the introduction of independent random variation for each current source. The physical differences in the current sources may be modulated by the individual digital switching waveforms $\hat{b}_0$, $\hat{b}_1$, etc., as illustrated in FIG. 9. These are time-domain signals that depend on the statistics of the input signal, (t), as well as the value coding scheme. In order to write the total quantized output of the DAC, (t), the individual bit waveforms may be summed. The quantizer output may be written as the sum of its input and signal dependent quantizer noise, e, as, $$x_Q(t) = \sum_{n=0}^{N-1} x_{Q_n}(x(t)) = \sum_{n=0}^{N-1} [x(t) + \epsilon(x(t))] \quad (5)$$

Fourier series expansion of the normalized quantization error sequence (x) as a function of the input signal, x, is expressed below. $\Delta$ represents the levels of the quantizer, the levels corresponding to the lowest level of change permitted by adding and removing combinations of bits.

$$e_n(x) = \frac{\epsilon(x)}{\Delta} = \frac{1}{2\pi j} \sum_{l \neq 0} \frac{1}{l} e^{\frac{2\pi j l x}{\Delta}} = \frac{1}{\pi j} \sum_{l=1}^{\infty} \frac{1}{l} \sin\left(2\pi l \frac{x}{\Delta}\right) \quad (6)$$

The time-domain nature of the input, (t), may be later substituted to obtain the frequency domain spectrum. In the "operation" case of a binary implementation, distinct switching bit waveforms may be observed for an N-bit DAC since current sources will be switched in weighted clusters. The switch waveforms are periodic square-waves with the period varying from MSB to LSB. Assuming that the input signal x spans a range (−A, A), the $m^{th}$ current source (m=1 for MSB) waveform, (x), is expressed as a Fourier series expansion in x.

$$S_m(x) = \frac{2}{\pi j} \sum_{\substack{l=-\infty \\ l \, odd}}^{\infty} \frac{1}{l} e^{\frac{\pi l j x}{A} 2^{m-1}} \quad (7)$$

This expression is true so long as the original time signal frequency and the sampling frequency are not related as a rational ratio. For an N-bit binary DAC (n=0 . . . N−1) the expression may be expanded and written in terms of resolution N and bits n.

$$x_{Q_n}(t) = \sum_{q=1}^{\infty} A_{odd}(q) \sin[(2q-1)\omega t], \text{ odd harmonics} \quad (8)$$

Where, $$A_{odd}(q) = \frac{-8}{\pi 2^{N-n}} \sin(\pi 2^{N-n-1} + \frac{\pi}{2}) \sum_{k=1}^{\infty} \frac{1}{2k-1} J_{2q-1}\left[(2k-1)\frac{2^{N-n}}{2A}\pi\right] \quad (9)$$

and $J_n(z)$ is a Bessel function of the first kind.

Figure 12:
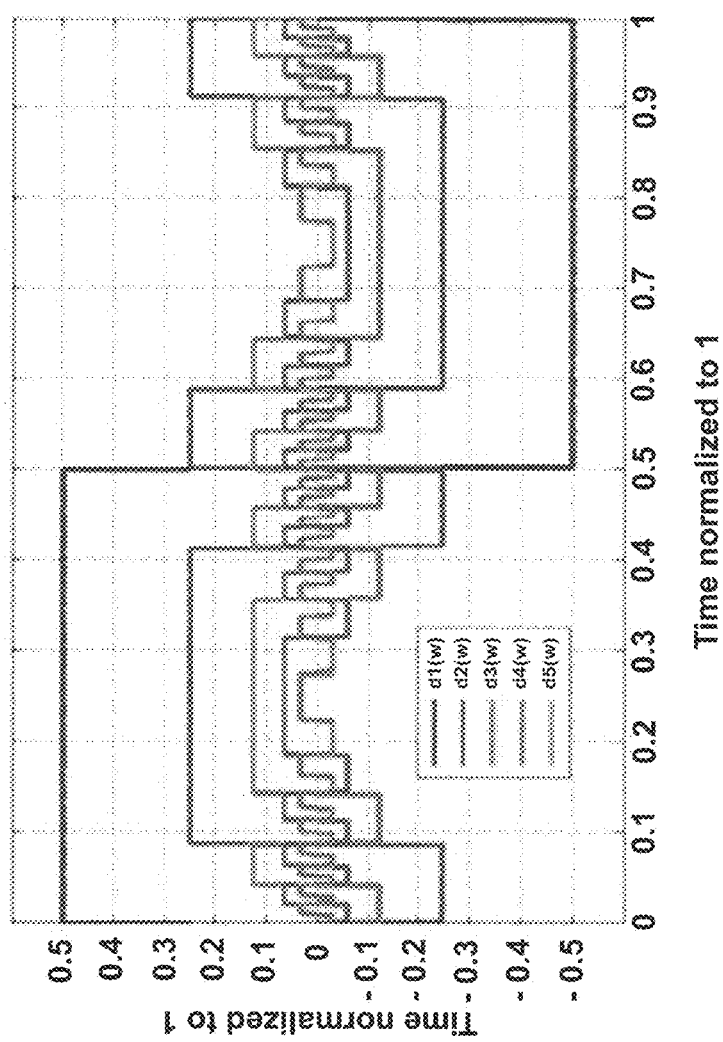
FIG. 12 depicts individual DAC bit waveforms.

The weighted, normalized, time dependent bit waveforms of five bits, d1-d5, with peak amplitude A=1, composed of 1000 harmonics are illustrated in FIG. 12, corresponding to the output from each individual cell of FIG. 10. A cell is a combination of current source and switch pair that feed the resistor; all parts come together on resistor to give final output.

Analysis for the bit waveforms has been done on a full scale sinusoid in the available quantization space. The total contributions to each harmonic content may be analyzed relative to the carrier in dBc, illustrated in FIGS. 13A-13B.

Figures 13A, 13B:
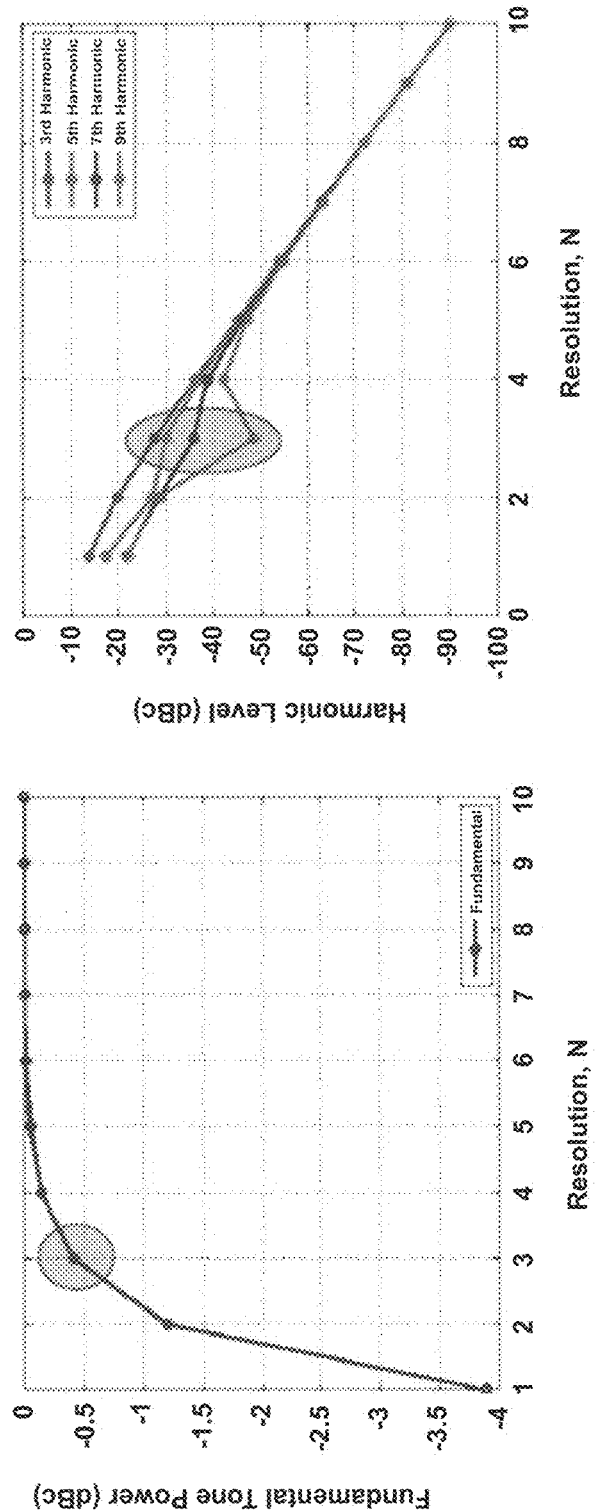
FIGS. 13A-13B depict a comparison of harmonic content and DAC resolution.

FIGS. 13A-13B illustrate features that are noted for a 3-Bit resolution binary DAC. This topology yields a wide range of unique harmonic responses. FIG. 13A illustrates the power of the fundamental frequency, while FIG. 13B illustrates diminished power in the harmonics. Specifically, the 9th harmonic includes a notch for a 3-Bit DAC at 49 dBc (see FIG. 13B). It is also noted that beyond 5 Bits the values of the harmonics are very similar.

Figures 14A, 14B:
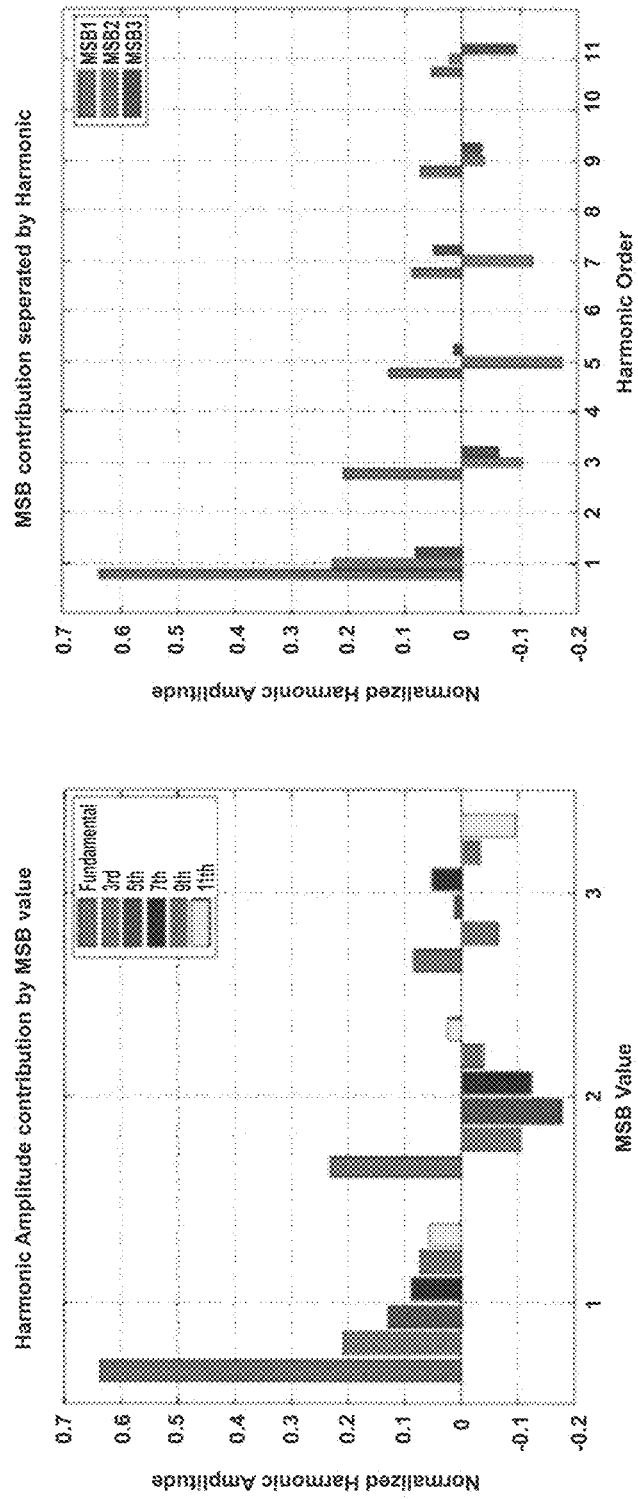
FIGS. 14A-14B depict harmonic amplitude contributions by most significant bit (MSB) value.

The spectral contribution may be modeled based on the contribution of each bit's waveform to the normalized harmonic amplitude, as illustrated in FIGS. 14A-14B. FIG. 14A illustrates the frequency contribution of each cell, and FIG. 14B depicts the same data in a different array. A 3-bit DAC is presented to correlate the previous unique results. Alternate instantiation of a digital to analog converter may provide additional knobs for shaping the output of the design, i.e. different changes to the structure, device sizes, and using different architectures such as a resistive ladder, etc.

Deterministic Statistical Response

The mean value, maxima, minima, standard deviation, and moments of the statistical response of an aggregate of circuits in the same manufacturing lot are dependent on the distribution of the random variables in the integrated circuit design. These are dominated by the threshold voltage and mobility of the switches in the integrated circuit design. The response of the integrated circuit is deterministic based on the values presented which can be known to the user. A response that is not predicted, i.e. not within the expected statistical window, may be the result of a process that has been altered, does not meet the specifications guaranteed by the manufacturer, or the result of changes to the design architecture. To model the variation in the current sources, $A_{odd}(q)$ is calculated and then re-introduced as a random variable. Variation of the amplitude of each bit waveform is equivalent to a variation in the current source value illustrated in FIG. 15.

Figure 15:
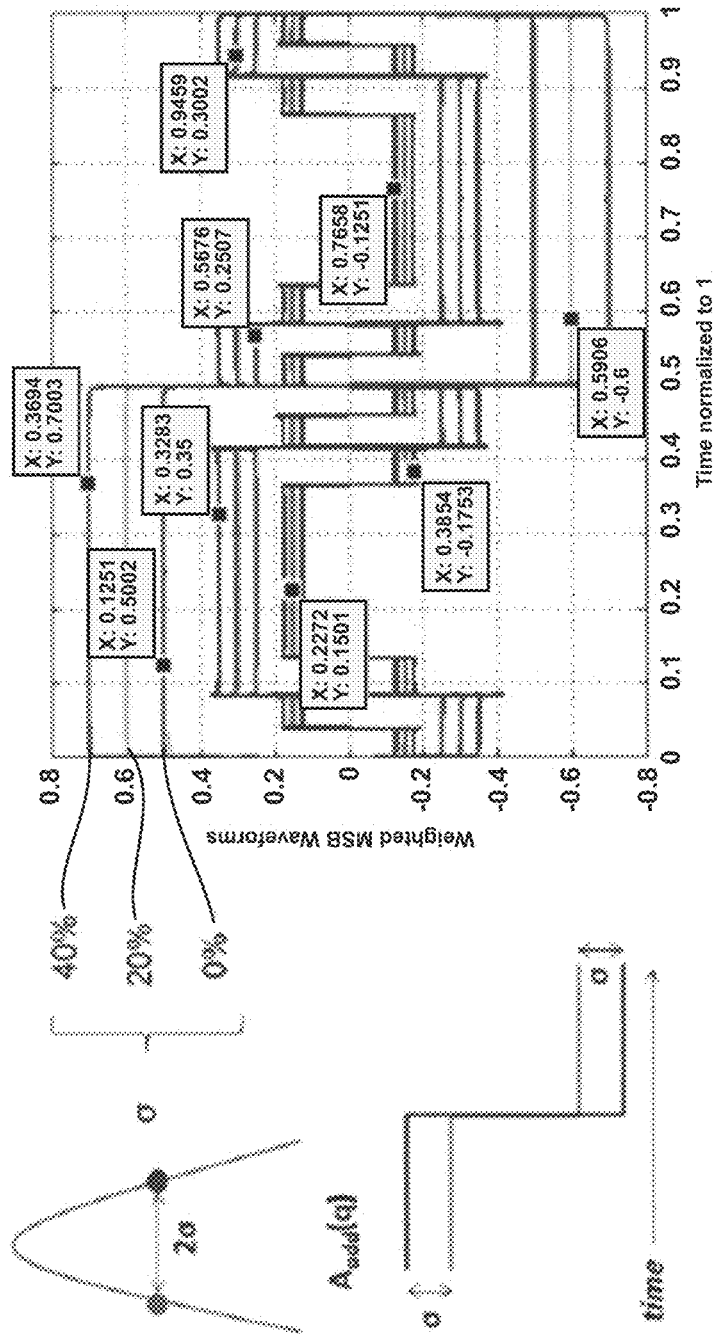
FIG. 15 depicts bit waveforms with variation.
Figure 16:
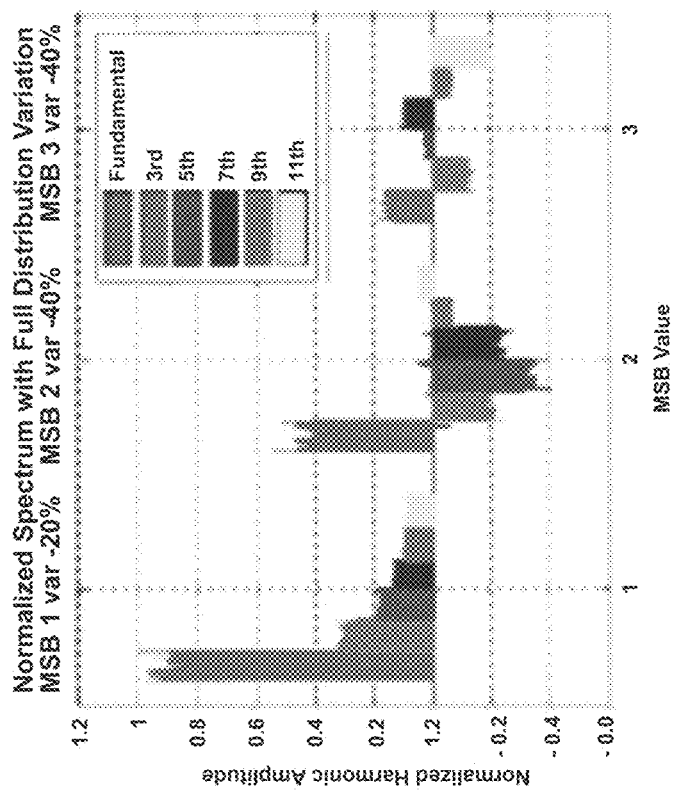
FIG. 16 depicts harmonic amplitude contribution by MSB value with variation.

A fixed static variation is placed on each of the bit waveforms to show an amplitude response change in the time domain waveforms (see FIG. 15). Large variation, 20% and 40%, is illustrated for concept purposes. Ripple seen in the waveforms is due to the limited number of summation terms, which is the total number of harmonic contributions. The effects of variation on the spectral contributions are illustrated in FIG. 16. Each of the points in the probability distribution function is plotted. Each value has a thin line plotted, showing change at the top; the graph turned sideways would show distribution function.

Figure 17:
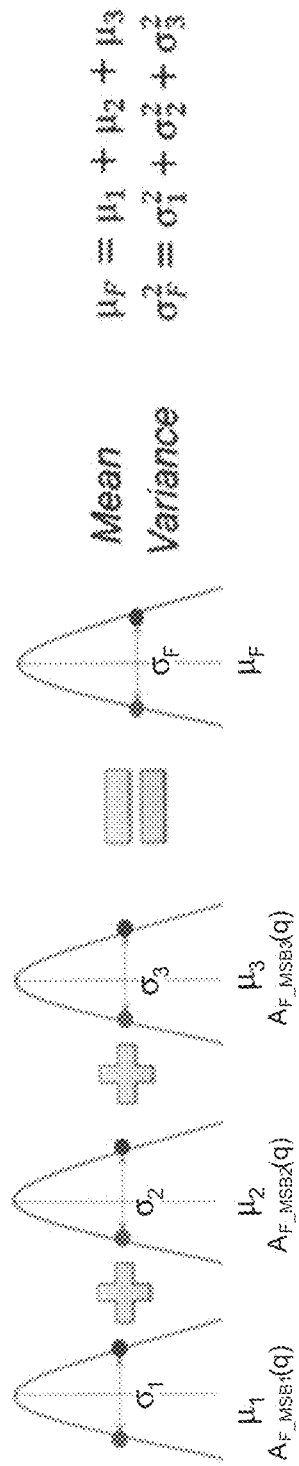
FIG. 17 depicts the mathematical operation of the sum of normal distributions.

The overall contribution of the variation on the individual bit may be analyzed with respect to the probability distribution function of the resulting amplitude of each harmonic. If each variation is modeled as a normal distribution, the resulting math operation is illustrated in FIG. 17. That is, FIG. 17 illustrates the mathematical operation of adding distributions.

Figure 18:
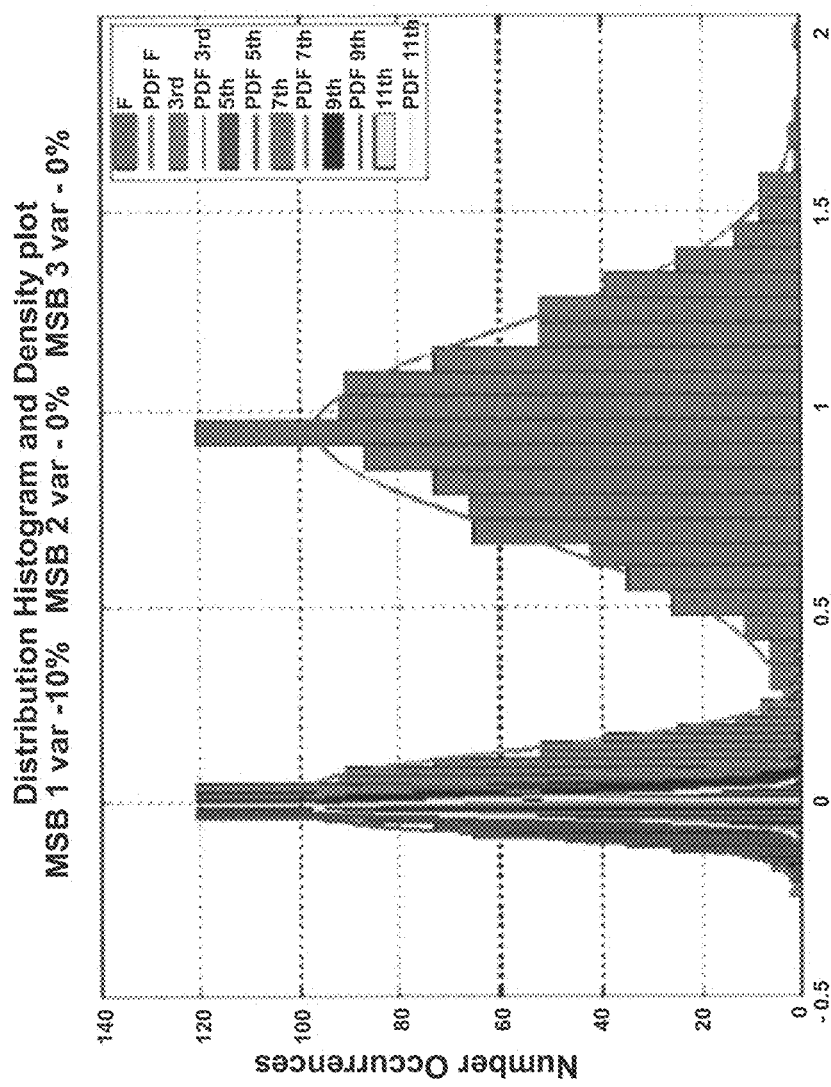
FIG. 18 depicts a probability distribution of normalized amplitude with MSB 1 variation.

The model is exercised for 40% variation on the MSB in FIG. 18. FIG. 18 illustrates that the largest change in the distribution of the harmonic amplitude may be in the fundamental frequency. This is the result when relating to the harmonic contribution of the MSB in FIGS. 14A-14B. The MSB contributes more than 3 times more to the fundamental than any of the other bits, as illustrated in FIG. 18. Smaller effects result in the subsequent harmonics and are relative to the harmonic contribution.

First Level Implementation

Figures 19A, 19B:
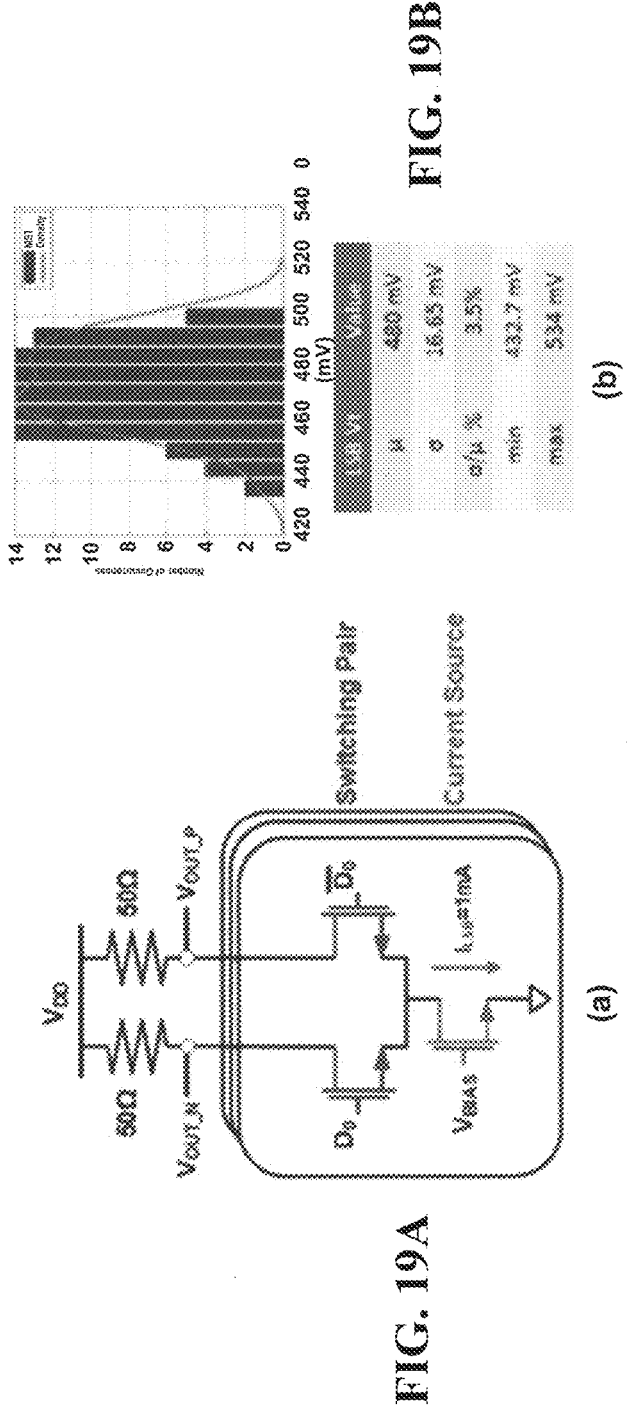
FIGS. 19A and 19B depict a basic current steering DAC that is cell implemented and a threshold distribution, respectively.
Figures 20A, 20B:
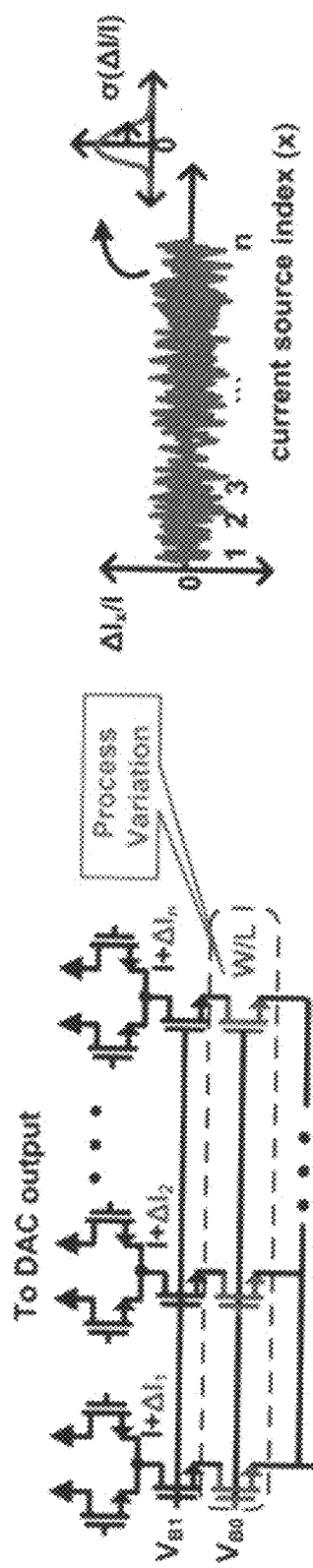
FIGS. 20A-20B depict process variation induced cell current effects.

A model for macro-level performance was developed and simulation at the device level in advance design tools has provided specific traits of interest, i.e. the frequency response and amplitude of the harmonic provided a finite potential. The behavior was integrated with, and is dependent on, foundry process information for development of specific output traits. Specifically, the current drive (bias) is fed with a distribution that correlates with the threshold voltage and "Beta" factor for the implemented device array, e.g. current source. The Beta factor may contain the effects of the device based on the mobility, saturation velocity, and area of the device. The device models utilized may be provided by the individual chip manufacturing companies to capture the electrical behavior in a process design kit, also known as a PDK. Circuits may be fabricated at the foundry of the users choice, based on the PDK used the get the intended/modeled statistical response of the circuit FIGS. 19A-19B depict the basic design of a 3-Bit current steering DAC in 90 nm CMOS technology. The design operates at $V_{DD}$=1.2V with $I_{LSB}$=1 mA and $R_L$=50Ω as illustrated in FIG. 19A along with the threshold distribution of the LSB cell over 100 simulations (the distributions shown are developed from 100 monte carlo simulations) in FIG. 19B. The threshold distribution differs for each current source to contribute to a change in the expected current. FIGS. 20A-20B illustrate a physical visualization of two separate contributing current sources for each cell, the design current I, and the process variation induced current ΔI. The design current is the current that was intended and the delta adds the variation change in additive or degraded way in a random fashion, as shown.

Figures 21A, 21B, 21C:
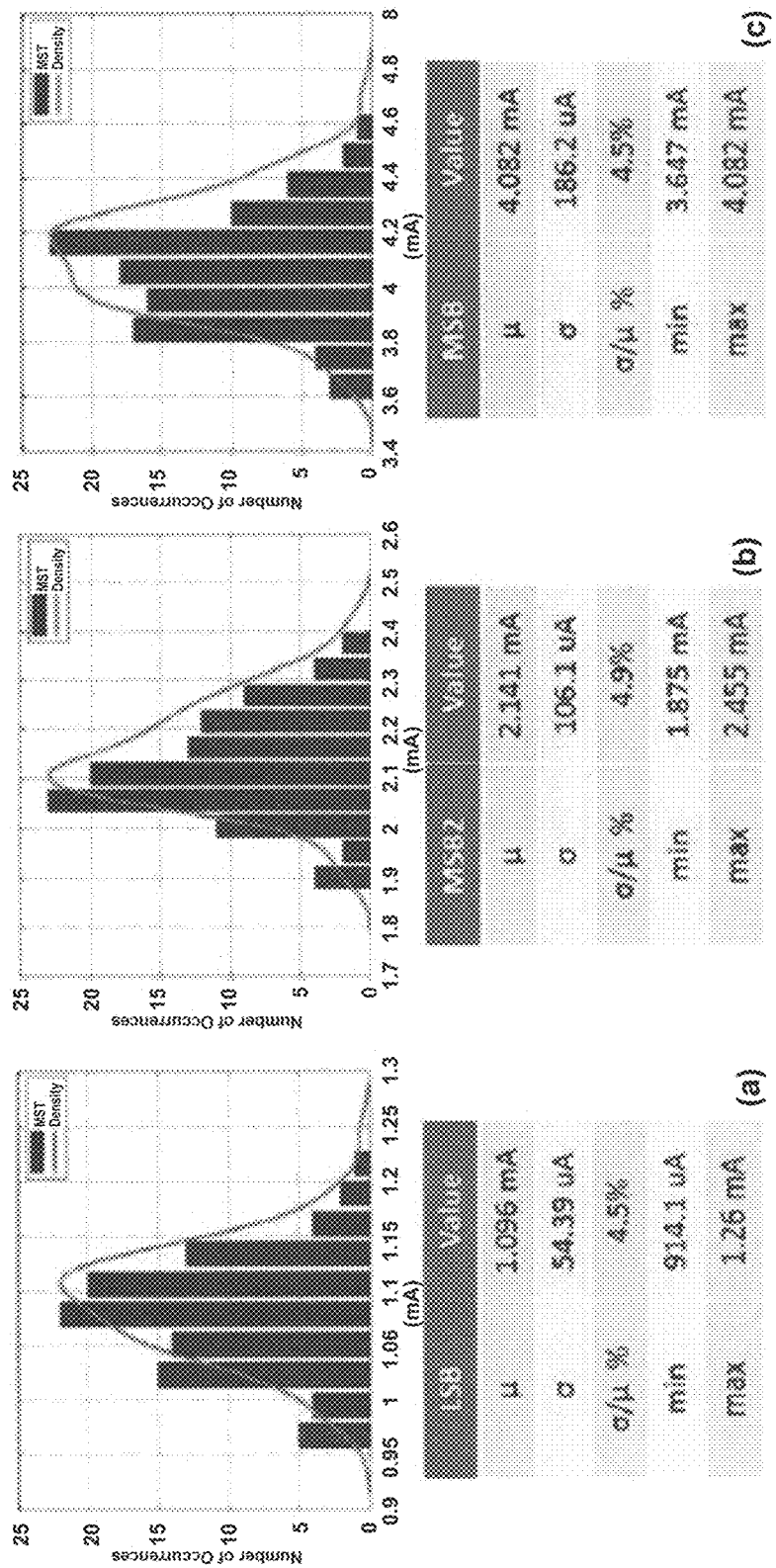
FIGS. 21A, 21B, and 21C depict 90 nm DAC current cell distributions of least signification bit (LSB), MSB 2, and MSB, respectively.

FIGS. 21A-21C illustrate 90 nm DAC current cell distributions of LSB (FIG. 21A), MSB2 (FIG. 21B), and MSB (FIG. 21C). The maximum theoretical output voltage swing, $V_{pp}$, for the bit waveforms is 700 mV ($V_p$=$R_L$×($I_{LSB}$+2$I_{LSB}$+4$I_{LSB}$)=50 Ω×7 mA=350 mV). The input signal was sampled with an ideal ADC to develop the inputs for the bit waveform that were clocked at $f_{CLK}$=4 GHz. The distribution for each resultant current cell is shown in FIGS. 21A-21C. The variation in the threshold for each cell contributes to distribution for each of the cells.

Figures 22A, 22B, 22C:
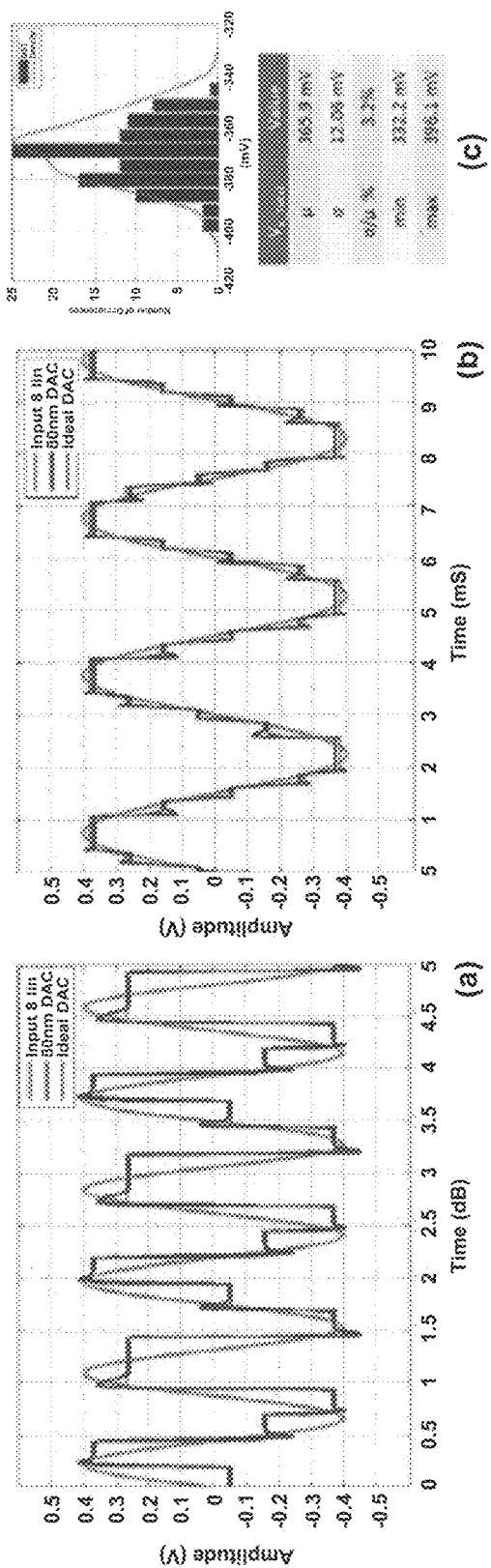
FIGS. 22A, 22B, and 22C depict DAC waveform outputs at 1.145 GHz, 331 MHz, and peak voltage output distribution, respectively.

Output of DAC simulations at 1.145 GHz and 331 GHz and are illustrated in FIGS. 22A-22B, respectively. The mean values of the statistical current distributions are used for simulation, therefore, maximum swing is increased from theoretical as they are larger than the ideal values. This is illustrated in FIG. 22C by means of distribution of the output voltage. It is noted that, although the signal was clocked at more than twice the fundamental frequency for each waveform, all of the quantization levels are not captured for each cycle of the DAC operating at 1.145 GHz. The DAC operating at 331 MHz is able to capture a much greater portion of the full resolution of the quantizer (DAC). The number of transitions of the bit waveforms captured determines the final output contribution.

Figure 23C:
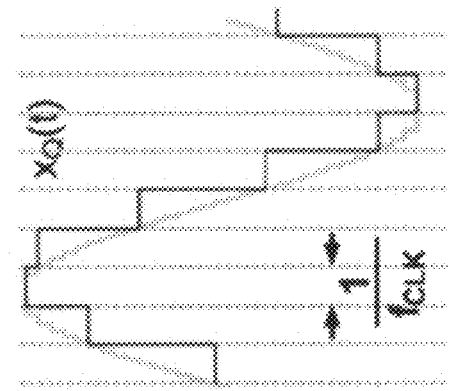
FIGS. 23A-23C depict finite resolution in sampling waveforms.
Figure 23B:
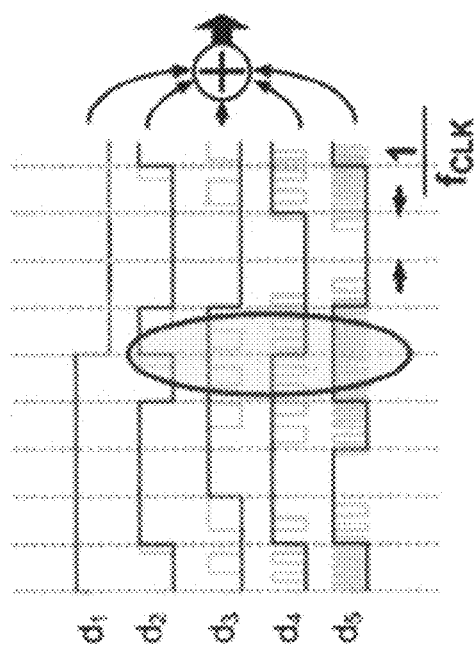
Figure 23A:
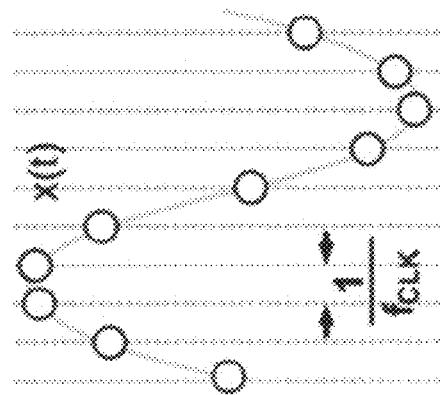

FIGS. 23A-23C illustrate that the input frequency challenge has a deterministic output based on how the signal data is clocked or sampled, i.e. finite resolution based on clock speed. The grey curves represent finite resolution in the DAC output waveform, whereas the red curve will have a coarser response. These responses, based solely on the varying clock, provide different harmonic responses in generating a PSF response.

Figure 24B:
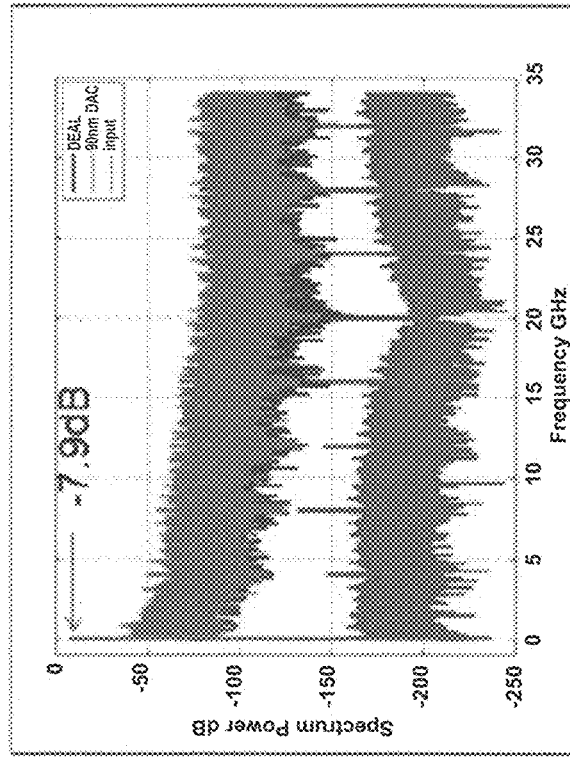
FIGS. 24A-24B depict DAC output spectrum of 37 MHz signal clocked at 4 GHz.
Figure 24A:
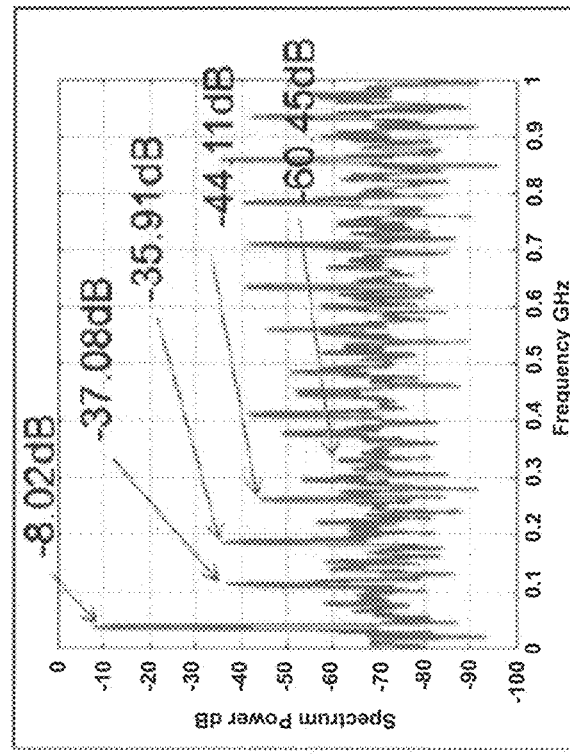

FIGS. 24A-24B illustrate a spectral response as the DAC is challenged with a 31 MHz signal to maximize capture of the bit waveform switching.

The harmonic spectrum contains distortion products at power levels relative to the first pass theoretical model, i.e. idealized, but unique to the implemented design based on variations in the LSB current scaling. A summary of the harmonic content, rounded to the nearest dB, is given in Table 1 and is compared against the results of FIG. 13 for completeness. Table 1 shows that there is a trend that relates to theory, but more fidelity in the ideal theory case may be needed to get actual values that would be compared against hardware. Simulation adds the fidelity of the actual device model.

TABLE 1

Theoretical vs. Simulated Harmonic Content Results for a 3-Bit DAC

| Harmonic | Theoretical Prediction | Simulated Results |
|---|---|---|
| Fundamental | 0.4 dBc | 0.3 dBc |
| $3^{rd}$ | 28 dBc | 29 dBc |
| $5^{th}$ | 29 dBc | 28 dBc |
| $7^{th}$ | 36 dBc | 36 dBc |
| $9^{th}$ | 49 dBc | 52 dBc |

The invention of a "Process Specific Function" (PSF) is introduced as a unique behavior(s) that can be used to identify and group circuits of the same pedigree and provide traits for individual chip authentication. Furthermore, these traits can be used for purposes of reliability prediction and monitoring.

Implementation of the PSF concept is expanded on herein to illustrate embodiments in a novel mixed-signal quantizer architecture. The digital-to-analog converter block as implemented in modern CMOS simulation capabilities shows predictable and trackable circuit traits, including random process variations.

Value

The invention implements design methodology to provide a measurable response in the frequency domain of analog/mixed-signal circuits. This response can provide trackable data for authentication, identification, reliability monitoring, and analysis for origin-of-manufacturing applications. Once a fingerprint is identified through measurement with the potential to have a completely independent model prediction capability, a chip can be authenticated based solely upon fabrication traits. The physical behavior of the device over time and in its operation may be used to determine lifetime, age, and function.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of authenticating and identifying analog mixed-signal integrated circuits using process-specific functions (PSF), the method comprising:

(a) presenting a wafer having a plurality of dies, each die having a PUF-free integrated circuit with an identical design;

(b) defining two or more digital inputs for authenticating and identifying each of the integrated circuits;

(c) defining a common expected analog response to each of the two or more digital inputs from the integrated circuits having the identical design, with each common expected analog response corresponding to one of the two or more digital inputs;

(d) defining a statistical window for each of the common expected analog responses to the two or more digital inputs by each of the integrated circuits having the identical design;

(e) applying the two or more digital inputs to each of the integrated circuits;

(f) receiving analog responses corresponding to the applied inputs, wherein when the analog responses fall outside the statistical window for a particular integrated circuit, that particular integrated circuit is unable to be both identified and authenticated;

(g) receiving the analog response corresponding to the applied inputs, wherein when the analog responses fall within the statistical window, that integrated circuit is identified and authenticated;

(h) identifying which dies include the integrated circuits having the analog response outside the statistical window corresponding to the identical design;

(i) separating from the plurality of dies any die which includes the integrated circuit providing the analog response outside the statistical window, wherein only identified and authenticated integrated circuits remain, wherein the two or more digital inputs for authenticating and identifying each of the integrated circuits include two or more of frequency, amplitude, voltage, and current.

2. An apparatus for authenticating and identifying analog mixed-signal integrated circuits using process-specific functions (PSF) comprising:

a memory block storing two or more digital inputs for authenticating and identifying a PUF-free integrated circuit;

a SRAM module in communication with the memory block;

two or more probability distribution functions (PDFs), with one PDF for each of the two or more digital inputs;

a current source array in communication with the SRAM module for communicating two or more digital inputs into the integrated circuit, wherein the apparatus functions as a digital-to-analog converter and generates an analog amplitude response from the integrated circuit for each of the inputs based on a particular integrated circuit design in response to the one or more inputs from the memory block based on a design of the integrated circuit, and compares a PDF for each of the common expected analog responses to the inputs by each of the integrated circuits having the identical design.

3. The apparatus for authenticating and identifying analog mixed-signal integrated circuits using process-specific functions (PSF) of claim 2, wherein the apparatus is incorporated into each integrated circuit.

* * * * *